(12) United States Patent
Jung et al.

(10) Patent No.: US 11,206,685 B2
(45) Date of Patent: Dec. 21, 2021

(54) APPARATUS AND METHOD FOR UPLINK TRANSMISSION IN WIRELESS COMMUNICATION SYSTEM

(71) Applicants: Samsung Electronics Co., Ltd., Suwon-si (KR); Korea University Research and Business Foundation, Seoul (KR)

(72) Inventors: Byounghoon Jung, Suwon-si (KR); Chunggu Kang, Seoul (KR); Chungkee Kim, Seoul (KR); Chanseok Yang, Seoul (KR)

(73) Assignees: Samsung Electronics Co., Ltd., Suwon-si (KR); Korea University Research and Business Foundation, Seoul (KR)

(*) Notice: Subject to any disclaimer, the term of this patent is extended or adjusted under 35 U.S.C. 154(b) by 163 days.

(21) Appl. No.: 16/669,285

(22) Filed: Oct. 30, 2019

(65) Prior Publication Data
US 2020/0137796 A1    Apr. 30, 2020

(30) Foreign Application Priority Data
Oct. 30, 2018    (KR) .................. 10-2018-0130916

(51) Int. Cl.
*H04W 74/08* (2009.01)
*H04W 72/10* (2009.01)
*H04W 72/08* (2009.01)
*H04W 24/08* (2009.01)

(52) U.S. Cl.
CPC .......... *H04W 74/08* (2013.01); *H04W 24/08* (2013.01); *H04W 72/082* (2013.01); *H04W 72/10* (2013.01)

(58) Field of Classification Search
CPC ... H04W 74/08; H04W 72/10; H04W 72/082; H04W 24/08; H04W 74/0808; H04W 16/14
See application file for complete search history.

(56) References Cited

U.S. PATENT DOCUMENTS

| | | | |
|---|---|---|---|
| 8,923,254 B2 | 12/2014 | Park et al. | |
| 9,942,010 B1* | 4/2018 | Chu | H04L 5/0007 |
| 2013/0058317 A1* | 3/2013 | Park | H04L 5/0053 |
| | | | 370/336 |
| 2014/0160967 A1* | 6/2014 | Gao | H04L 5/0073 |
| | | | 370/252 |
| 2017/0181155 A1* | 6/2017 | Chen | H04W 72/0413 |

(Continued)

*Primary Examiner* — Christine Ng

(57) ABSTRACT

The disclosure relates to a fifth-generation (5G) or a pre-5G communication system for supporting a higher data transfer rate than a fourth-generation (4G) communication system such as Long-Term Evolution (LTE). The disclosure relates to uplink transmission in a wireless communication system, in which an operating method of a user equipment (UE) may include: receiving information about a UE group to which the same uplink resource is allocated from a base station; receiving uplink resource allocation information corresponding to the UE group from the base station; performing channel access for uplink transmission on the basis of the received uplink resource allocation information; and transmitting uplink data to the base station after accessing a channel, wherein the channel access may be performed using a multilevel threshold value in a contention slot for the UE.

20 Claims, 47 Drawing Sheets

(56) References Cited

U.S. PATENT DOCUMENTS

| | | | | |
|---|---|---|---|---|
| 2018/0160443 A1* | 6/2018 | Tang | .................... | H04W 72/12 |
| 2018/0317256 A1* | 11/2018 | Um | .................. | H04W 74/0808 |
| 2019/0289618 A1* | 9/2019 | Dudda | ................. | H04L 1/1657 |
| 2019/0320463 A1* | 10/2019 | Yamada | ................ | H04W 16/14 |
| 2020/0092880 A1* | 3/2020 | Choi | .................... | H04L 5/0094 |

* cited by examiner

APPARATUS AND METHOD FOR UPLINK TRANSMISSION IN WIRELESS COMMUNICATION SYSTEM

CROSS-REFERENCE TO RELATED APPLICATION

This application is based on and claims priority under 35 U.S.C. 119 to Korean Patent Application No. 10-2018-0130916 filed on Oct. 30, 2018 in the Korean Intellectual Property Office, the disclosure of which is herein incorporated by reference in its entirety.

BACKGROUND

1. Field

The disclosure relates to a wireless communication system, and more particularly to an apparatus and a method for uplink transmission in a wireless communication system.

2. Description of Related Art

In order to meet the demand for wireless data traffic, which has been increasing since the commercialization of a 4th-generation (4G) communication system, efforts are being made to develop an improved 5th-generation (5G) communication system or pre-5G communication system. For this reason, a 5G communication system or pre-5G communication system is referred to as a beyond-4G-network communication system or a post-Long-Term-Evolution (LTE) system.

To achieve a high data transmission rate, implementation of a 5G communication system in an extremely high frequency (mmWave) band (for example, a 60 GHz band) is being considered. To alleviate the path loss of radio signals and to increase the transmission distance of radio signals in an extremely high frequency band, beamforming, massive multiple-input multiple-output (massive MIMO), full-dimensional MIMO (FD-MIMO), array antenna, analog beamforming, and large-scale antenna techniques are under discussion for implementation in a 5G communication system.

Further, to improve the network of the system, technical development for implementation of an evolved small cell, an advanced small cell, a cloud Radio Access Network (cloud RAN), an ultra-dense network, device-to-device (D2D) communication, wireless backhaul, a moving network, cooperative communication, coordinated multi-points (CoMP), and reception interference cancellation in 5G communication systems is progressing.

In addition, advanced coding modulation (ACM) schemes including hybrid frequency shift keying and quadrature amplitude modulation (FQAM) and sliding window superposition coding (SWSC) as well as advanced access techniques including filter bank multi-carrier (FBMC), non-orthogonal multiple access (NOMA), and sparse code multiple access (SCMA) are being developed for implementation in 5G systems.

A communication system supporting license-assisted access (LAA) performs a listen-before-talk (LBT) procedure for coexistence with a communication system using an unlicensed band. A UE transmits uplink data after receiving an uplink grant if a channel is not occupied by a different node. However, since an entity allocating a resource is different from an entity performing the LBT, a different node may occupy the channel in actual uplink data transmission, and thus the UE may experience uncertainty in accessing the uplink channel. In order to overcome the deterioration in uplink performance, a method of allocating the same resource to a plurality of UEs and providing channel access opportunities for the respective UEs is required.

The above information is presented as background information only to assist with an understanding of the disclosure. No determination has been made, and no assertion is made, as to whether any of the above might be applicable as prior art with regard to the disclosure.

SUMMARY

In view of the foregoing aspects, the disclosure provides an apparatus and a method for uplink transmission in a wireless communication system.

The disclosure provides an apparatus and a method for overbooked uplink (OUL) transmission in an unlicensed band in a wireless communication system.

The disclosure provides an apparatus and a method for grouping UEs for OUL transmission in a wireless communication system.

The disclosure provides an apparatus and a method for allocating a resource for OUL transmission to each UE group in a wireless communication system.

The disclosure provides an apparatus and a method for allocating a resource for OUL transmission to UEs in a UE group in a wireless communication system.

The disclosure provides an apparatus and a method for performing uplink channel access for OUL transmission in a wireless communication system.

According to various embodiments of the disclosure, an operating method of a user equipment UE in a wireless communication system may include: receiving information about a UE group to which the same uplink resource is allocated from a base station; receiving uplink resource allocation information corresponding to the UE group from the base station; performing channel access for uplink transmission on the basis of the received uplink resource allocation information; and transmitting uplink data to the base station after accessing a channel, wherein the channel access may be performed using a multilevel] threshold value in a contention slot for the UE.

According to various embodiments of the disclosure, an operating method of a base station in a wireless communication system may include: transmitting information about a UE group to which the same uplink resource is allocated to a UE; transmitting uplink resource allocation information corresponding to the UE group to the UE; and receiving uplink data from the UE, wherein the uplink resource allocation information may be used for channel access of the UE, and the channel access may be performed using a multilevel threshold value in a contention slot for the UE.

According to various embodiments of the disclosure, a UE in a wireless communication system may include: a transceiver, configured to receive information about a UE group to which the same uplink resource is allocated from a base station and to receive uplink resource allocation information corresponding to the UE group from the base station; and at least one processor, configured to perform channel access for uplink transmission on the basis of the received uplink resource allocation information and to transmit uplink data to the base station after accessing a channel, wherein the channel access may be performed using a multilevel threshold value in a contention slot for the UE.

According to various embodiments of the disclosure, a base station in a wireless communication system may include: at least one processor; and a transceiver configured to transmit information about a UE group to which the same uplink resource is allocated to a UE, to transmit uplink resource allocation information corresponding to the UE group to the UE, and to receive uplink data from the UE, wherein the uplink resource allocation information may be used for channel access of the UE, and the channel access may be performed using a multilevel threshold value in a contention slot for the UE.

An apparatus and a method according to various embodiments of the disclosure may define a signaling procedure for a UE and a base station to perform overbooked uplink (OUL) transmission by allocating the same radio resource to a plurality of UEs in an unlicensed band, thereby avoiding deterioration in uplink performance.

An apparatus and a method according to various embodiments of the disclosure may enable UEs performing OUL transmission to perform energy detection using a two-level threshold, thereby minimizing uncertainty in channel access.

Effects which can be acquired by the disclosure are not limited to the above described effects, and other effects that have not been mentioned may be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
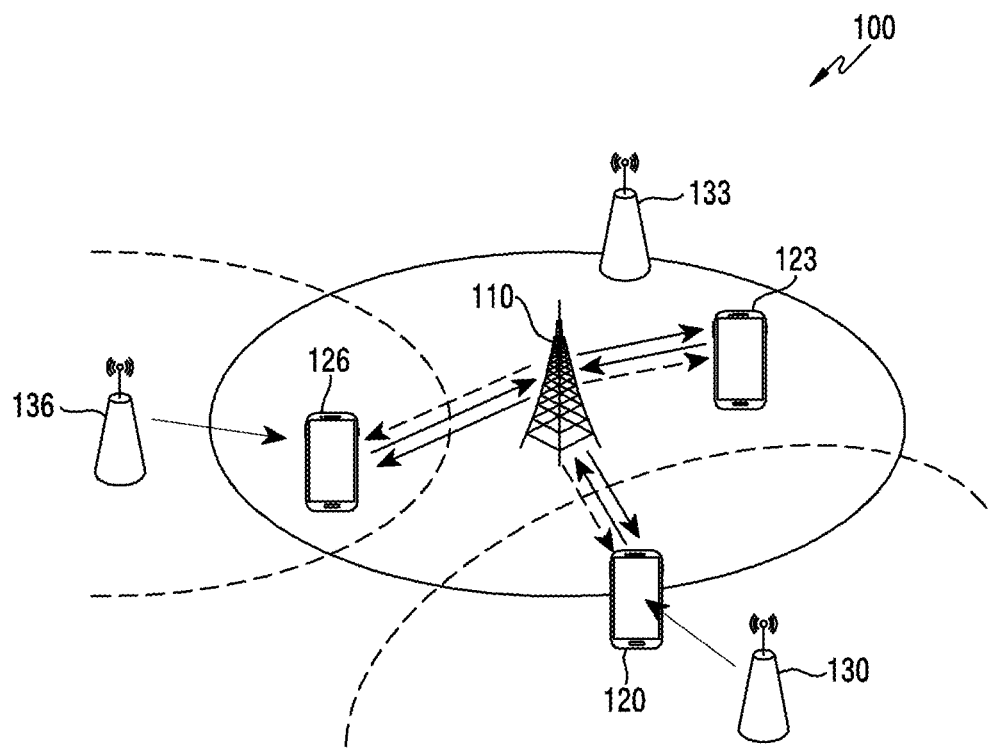
FIG. 1 illustrates a wireless communication system according to various embodiments of the disclosure.

FIGS. 1 through 31C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

As used herein, the expression "A or B" or "at least one of A and/or B" may include all possible combinations of items enumerated together. The expression "a first", "a second", "the first", or "the second" may modify various elements regardless of the order and/or the importance, and is used merely to distinguish one element from another element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments may be interchangeably used with, for example, "suitable for", "having the capacity to", "adapted to", "made to", "capable of", or "designed to" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

In order to perform uplink transmission in an unlicensed band, a UE may identify whether a channel is currently busy or idle through a listen-before-talk (LBT) procedure. Here, when the LBT procedure by the UE fails due to occupancy of the channel, the UE cannot use a resource allocated by a base station and channel access thereby may thus be uncertain. To solve deterioration in uplink performance, an overbooked uplink (OUL) method of allocating the same resource to a plurality of UE groups may be used.

Hereinafter, the disclosure relates to an apparatus and a method for uplink transmission in a wireless communication system supporting license-assisted access (LAA). Specifically, the disclosure illustrates a technique for grouping UEs, allocating resources, and accessing an uplink channel to perform OUL transmission in an unlicensed band in a wireless communication system.

As used herein, terms referring to signals, terms referring to channels, terms referring to control information, terms referring to network entities, terms referring to components of an apparatus, and the like are used for convenience of explanation. Therefore, the disclosure is not limited by the following terms, and other terms having equivalent technical meanings may be used.

Further, although the disclosure illustrates various embodiments using terms used in some communication standards (e.g., 3rd Generation Partnership Project (3GPP)), these standards are provided merely for convenience of description. Various embodiments of the disclosure may be easily modified and applied to other communication systems.

FIG. 1 illustrates a wireless communication system according to various embodiments of the disclosure.

Referring to FIG. 1, the wireless communication system 100 may include a base station 110, a UE 120, and a node 130. In the following disclosure, for convenience of explanation, a base station operating in a licensed band and a base station operating in an unlicensed band are separately described, which is merely for illustration to conceptually distinguish operations, but the disclosure is not limited thereto. That is, a single base station may actually operate both in a licensed band and in an unlicensed band.

The base station 110 is a network infrastructure that provides wireless access for a UE in coverage. The coverage may be defined as a certain geographic area based on the distance over which the base station 110 can transmit a signal. The base station 110 may provide service to UEs (e.g., UEs 120, 123, and 126) within the coverage (or cell). Here, the base station may be referred to as an access point (AP), an eNodeB (eNB), a 5th-generation (5G) node, a 5G NodeB (NB), a wireless point, a transmission/reception point (TRP), a digital unit (DU), a radio unit (RU), a remote radio head (RRH), or other terms with equivalent technical meanings, in addition to a base station. The base station 110 may communicate with at least one UE in the coverage.

The UE 120 is a device used by a user, and communicates with the base station 110 through a wireless channel. In some cases, at least one UE 120 may be operated without a users involvement. For example, the UE 120 may be a device performing Machine-Type Communication (MTC), and may not be carried by a user. The UE 120 may be referred to as user equipment (UE), a mobile station, a subscriber station, a remote UE, a wireless UE, an electronic device, a user device, or other terms with equivalent technical meanings, in addition to a UE. A UE (e.g., the UE 120) according to various embodiments of the disclosure may include at least one of, for example, a smartphone, a tablet PC, a mobile phone, a video phone, an electronic book reader, a desktop PC, a laptop PC, a netbook computer, a workstation, a server, a PDA, a portable multimedia player (PMP), an MP3 player, a medical device, a camera, and a wearable device. Although a description of a UE is made with reference to the UE 120, such a description may also be applied to the UE 123 and the UE 126.

The node 130 may provide wireless access for a UE in the coverage of an unlicensed band. The node 130 may support a communication service capable of operating in the unlicensed band. For example, the node 130 may be a device supporting Wireless Fidelity (Wi-Fi). In another example, the node 130 may be a device supporting a wireless local area network (WLAN). In still another example, the node 130 may be a device supporting Bluetooth. Hereinafter, for convenience of description, the node 130 will be described, by way of example, as an AP supporting a Wi-Fi communication system, but is not limited thereto. A description of a node operating in an unlicensed band has been made with reference to the node 130, but may also be applicable to nodes 133 and 136.

The wireless communication system 100 may include the base station 110, the UE 120, a UE 123, a UE 126, and a node 133. The situation is described in which the base station 110 is located outside the coverage of the node 130 and the coverage of the node 136. In addition, the situation is described in which the UE 120 is adjacent to the node 130, the UE 123 is adjacent to the node 133, and the UE 126 is adjacent to the node 136.

The wireless communication system 100 may be a wireless environment in which a licensed band and an unlicensed band coexist. The base station 110 and the UE 120 may be devices supporting LAA. The base station 110 and the UE 120 may occupy a channel after performing an LBT procedure for coexistence with the node 130 operating in the unlicensed band. Hereinafter, the channel, as an object of which the occupancy is to be determined, refers to a channel in the unlicensed band. The base station 110 may identify that the channel in the unlicensed band is not occupied through the LBT procedure. The base station 110 may determine a maximum channel occupation time (COT) for occupying the unlicensed band. Here, the maximum channel occupation time refers to the maximum amount of time allocated for the base station 110 and the UE 120 to perform uplink data transmission and downlink data transmission through the unlicensed band. The base station 110 may allocate a downlink resource for downlink transmission. The base station 110 may allocate an uplink resource to a UE (e.g., the UE 120) requiring uplink transmission. The base station 110 may transmit downlink data to the UE 120 during the channel occupation time through the downlink resource. The base station 110 may prevent nodes adjacent to the base station 110 from occupying the channel in the unlicensed band while transmitting the downlink data.

The UE 120 may identify whether the node adjacent to the UE 120 occupies the channel before transmitting uplink data. When it is determined that the channel is not occupied by a node adjacent to the UE 120, the UE 120 may transmit uplink data to the base station 110 through the allocated uplink resource. However, when the UE 120 transmits uplink data through the unlicensed band, the node 130 may occupy the unlicensed band. Since the channel in the unlicensed band is currently occupied (busy), the UE 120 may not transmit uplink data. Here, the uplink resource allocated by the base station 110 to the UE 120 is not used. That is, the uplink resource is wasted.

Hereinafter, FIG. 2 and FIG. 3 respectively illustrate the configuration of a base station 110 and the configuration of a UE 120 for performing OUL transmission in an unlicensed band.

Figure 2:
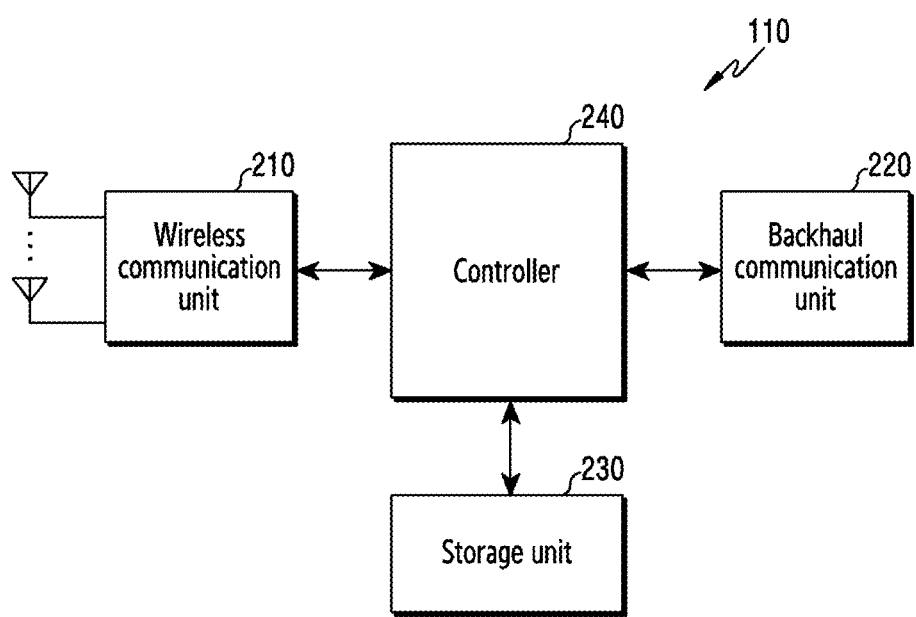
FIG. 2 illustrates the configuration of a base station in a wireless communication system according to various embodiments of the disclosure.

FIG. 2 illustrates the configuration of a base station 110 in a wireless communication system according to various embodiments of the disclosure. The configuration illustrated in FIG. 2 may be construed as the configuration of the base station 110. The terms unit, -or/er, and the like used herein indicate a unit for processing at least one function or operation, which may be implemented by hardware, software, or a combination thereof.

Referring to FIG. 2, the base station 100 includes a wireless communication unit 210, a backhaul communication unit 220, a storage unit 230, and a controller 240. The wireless communication unit 210 performs functions of transmitting or receiving a signal through a wireless channel. For example, the wireless communication unit 210 performs a function of conversion between a baseband signal and a bitstream according to the physical layer specification of a system. For example, in data transmission, the wireless communication unit 210 encodes and modulates a transmitted bitstream to generate complex symbols. Further, in data reception, the wireless communication unit 210 demodulates and decodes a baseband signal to reconstruct a received bitstream. The wireless communication unit 210 upconverts a baseband signal into a radio-frequency (RF) band signal, and may transmit the RF band signal through an antenna. The wireless communication unit 210 down converts an RF band signal, received through the antenna, into a baseband signal.

To this end, the wireless communication unit 210 may include a transmission filter, a reception filter, an amplifier, a mixer, an oscillator, a Digital-to-Analog Converter (DAC), an Analog-to-Digital Converter (ADC), or the like. Further, the wireless communication unit 210 may include a plurality of transmission/reception paths. In addition, the wireless communication unit 210 may include at least one antenna array including a plurality of antenna elements. From the aspect of hardware, the wireless communication unit 210 may include a digital unit and an analog unit, and the analog unit may include a plurality of sub-units that differ in operating power, operating frequency, or the like.

As described above, the wireless communication unit 210 transmits and receives a signal. Accordingly, some or all of the wireless communication unit 210 may be referred to as a transmitter, a receiver, or a transceiver. In the following description, transmission and reception performed through a wireless channel are construed as including processing performed as described above by the wireless communication unit 210.

The wireless communication unit 210 may transmit and receive a signal in a licensed band. A licensed band refers to a communication band allocated to a particular network provider so that a service is provided from the network provider. Further, the wireless communication unit 210 may transmit and receive a signal in an unlicensed band. An unlicensed band is a communication band (e.g., 5 GHz) that is available without permission from a network provider. The wireless communication unit 210 may perform carrier aggregation (CA). The wireless communication unit 210 may perform CA by configuring a carrier in a licensed band as a primary component carrier (PCC) and configuring a carrier in an unlicensed band as a secondary component carrier (SCC).

The backhaul communication unit 220 provides an interface for performing communication with other nodes in a network. That is, the backhaul communication unit 220 converts a bitstream, which is transmitted from the base station 110 to another node, for example, another access node, another base station, a higher node, a core network, or the like, into a physical signal, and converts a physical signal, which is received from another node, into a bitstream. In the disclosure, the base station 110 is described as operating both in the licensed band and in the unlicensed band. However, the base station 110 may operate in the licensed band, and a different base station may operate in the unlicensed band. The base station 110 may control the operation of the different base station in the unlicensed band through the backhaul communication unit 220. For example, the base station 110 may control the different base station to transmit control information including an uplink grant to the UE 120.

The storage unit 230 stores data, such as a default program, an application, and setting information, for the operation of the base station 110. The storage unit 230 may be configured as volatile memory, nonvolatile memory, or a combination of volatile memory and nonvolatile memory. The storage unit 230 provides the stored data in response to a request from the controller 240.

The controller 240 controls the overall operation of the base station 110. For example, the controller 240 transmits and receives a signal through the wireless communication unit 210 or the backhaul communication unit 220. Further, the controller 240 records and reads data in the storage unit 230. The controller 240 may perform the functions of a protocol stack required by the communication standards. To this end, the controller 240 may include at least one processor. According to various embodiments, the controller 240 may include a scheduler. The scheduler may allocate a resource for downlink transmission. The scheduler may also allocate a resource for uplink transmission. The scheduler is an instruction set or code stored in the storage unit 230, and may be an instruction or code at least temporarily residing in the controller 240, a storage space storing an instruction or code, or part of circuitry forming the controller 240. For example, the controller 240 may control the base station 110 to perform operations according to various embodiments to be illustrated below. The base station 110 according to various embodiments of the disclosure may refer to a base station operating in an LAA system or an NR-unlicensed (NR-U) system.

Figure 3:
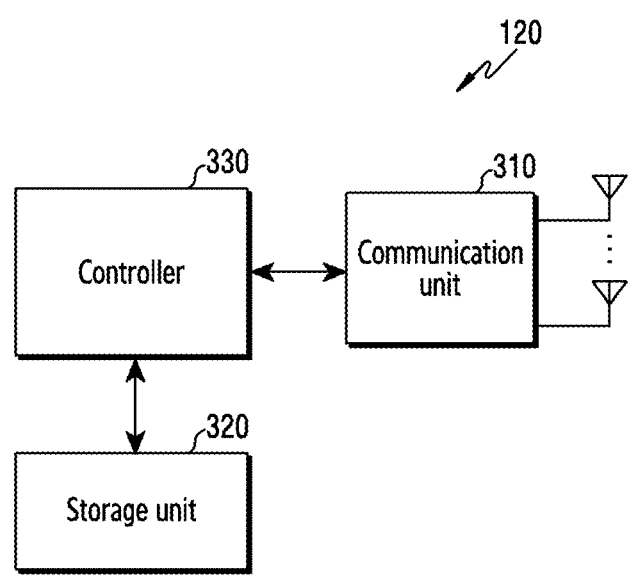
FIG. 3 illustrates the configuration of a UE in a wireless communication system according to various embodiments of the disclosure.

FIG. 3 illustrates the configuration of a UE 120 in a wireless communication system according to various embodiments of the disclosure. The configuration illustrated in FIG. 3 may be construed as the configuration of the UE 120. The terms unit, -or/er, and the like used herein indicate a unit for processing at least one function or operation, which may be implemented by hardware, software, or a combination thereof.

Referring to FIG. 3, the UE 120 includes a communication unit 310, a storage unit 320, and a controller 330. The communication unit 310 performs functions of transmitting or receiving a signal through a wireless channel. For example, the communication unit 310 performs a function of converting between a baseband signal and a bitstream according to the physical layer specification of a system. For example, in data transmission, the communication unit 310 encodes and modulates a transmitted bitstream to generate complex symbols. Further, in data reception, the communication unit 310 demodulates and decodes a baseband signal to reconstruct a received bitstream. The communication unit 310 upconverts a baseband signal into an RF band signal and may transmit the RF band signal through an antenna. The communication unit 310 down converts an RF band signal, received through the antenna, into a baseband signal. For example, the communication unit 310 may include a transmission filter, a reception filter, an amplifier, a mixer, an oscillator, a DAC, an ADC, or the like.

Further, the communication unit 310 may include a plurality of transmission/reception paths. In addition, the communication unit 310 may include at least one antenna array including a plurality of antenna elements. From the aspect of hardware, the communication unit 310 may include a digital circuit and an analog circuit (e.g., a radio-frequency integrated circuit (RFIC)). Here, the digital circuit and the analog circuit may be configured as a single package. Further, the communication unit 310 may include a plurality of RF chains. The communication unit 310 may perform beamforming.

In addition, the communication unit 310 may include different communication modules to process signals in different frequency bands. The communication unit 310 may include a communication module to process signals in a licensed band. For example, the communication unit 310 may include a communication module to access a cellular network of an LTE communication system. Further, the communication unit 310 may include a communication module to process signals in an unlicensed band. For example, the communication unit 310 may include a Bluetooth Low Energy (BLE) module, a Wi-Fi module, or a Wireless Gigabit (WiGig) module. The communication unit 310 may include a plurality of communication modules described above to support a plurality of different radio access technologies (RATs). The different frequency bands may include a super-high-frequency (SHF) band (e.g., 2.5 GHz and 5 GHz) and a millimeter-wave band (e.g., 60 GHz).

As described above, the communication unit 310 transmits and receives a signal. Accordingly, all or some of the communication unit 310 may be referred to as a transmitter, a receiver, or a transceiver. In the following description, transmission and reception performed through a wireless channel are to be understood as including processing performed as described above by the communication unit 310.

The storage unit 320 stores data, such as a default program, an application, and setting information, for the operation of the UE 120. The storage unit 320 may be configured as volatile memory, nonvolatile memory, or a combination of volatile memory and nonvolatile memory. The storage unit 320 provides the stored data in response to a request from the controller 330. The storage unit 320 may include a buffer. According to various embodiments, the storage unit 320 may store a plurality of transport blocks generated by the controller 330.

Figure 4A:
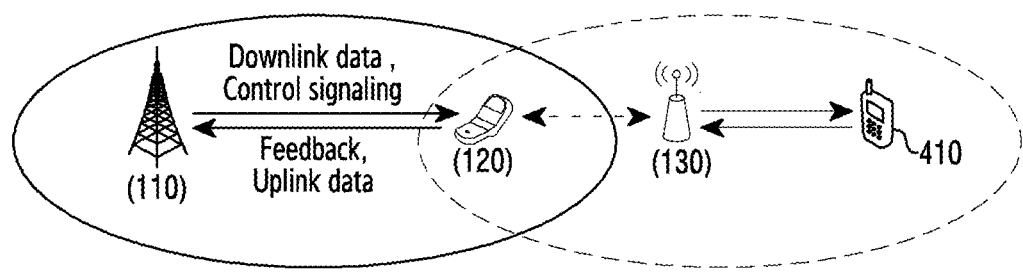
FIG. 4A illustrates an example of a network environment considered in a wireless communication system according to various embodiments of the disclosure.
Figure 4B:
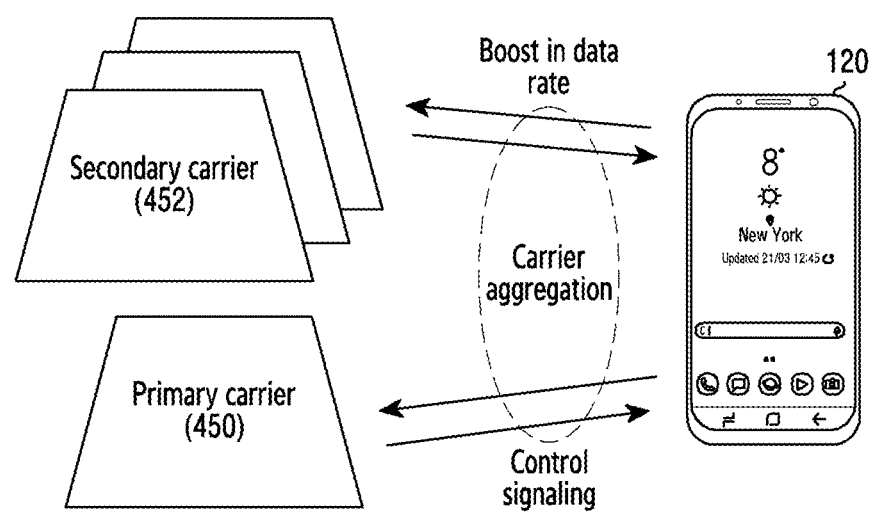
FIG. 4B illustrates an example of a network environment considered in a wireless communication system according to various embodiments of the disclosure.

The controller 330 controls the overall operation of the UE 120. For example, the controller 330 transmits and receives a signal through the communication unit 310. Further, the controller 330 records and reads data in the storage unit 320. The controller 330 may perform the functions of a protocol stack required by the communication standards. To this end, the controller 330 may include at least one processor or microprocessor, or may be configured as a part of a processor. A part of the communication unit 310 and the controller 330 may be referred to as a communication processor (CP). Particularly, according to various embodiments, the controller 330 controls the UE 120 to generate a transport block according to control information received from a base station 110 and to map the generated transport block to an allocated uplink resource. For example, the controller 330 may control the UE to perform operations according to various embodiments to be illustrated below. Hereinafter, FIG. 4A and FIG. 4B illustrate a network environment considered in various embodiments of the disclosure. The UE 120 according to various embodiments of the disclosure may refer to a UE operating in an LAA system or an NR-U system.

FIG. 4A illustrates an example of a network environment considered in a wireless communication system according to various embodiments of the disclosure.

Referring to FIG. 4A, a base station 110 and a UE 120 may correspond to a system using a synchronous radio access scheme (e.g., 3GPP LTE or NR OFDMA) that requires frame synchronization, and may perform a downlink LBT and an uplink LBT, respectively, in order to occupy a channel. A node 130 and a Wi-Fi UE 410 may correspond to a system using an asynchronous radio access scheme (e.g., carrier sense multiple access (CSMA) of IEEE 802.11 Wi-Fi/carrier aggregation (CA)) that does not require frame synchronization. Here, the system including the base station 110 and the UE 120 and the system including the node 130 and the Wi-Fi UE 410 may share the same frequency band. Further, an uplink and a downlink between the base station 110 and the UE 120 and an uplink and a downlink between the node 130 and the Wi-Fi UE 410 may be considered. For example, the base station 110 may transmit downlink data or may signal a control signal to the UE 120, and the UE 120 may transmit feedback on the received downlink data or uplink data to the base station 110.

FIG. 4B illustrates an example of a network environment considered in a wireless communication system according to various embodiments of the disclosure.

Figure 5A:
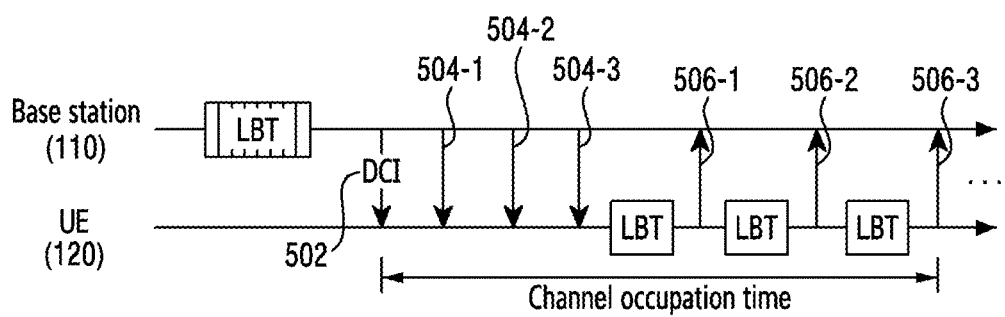
FIG. 5A illustrates an example of a scheduled uplink (SUL) transmission procedure in a wireless communication system according to various embodiments of the disclosure.
Figure 5B:
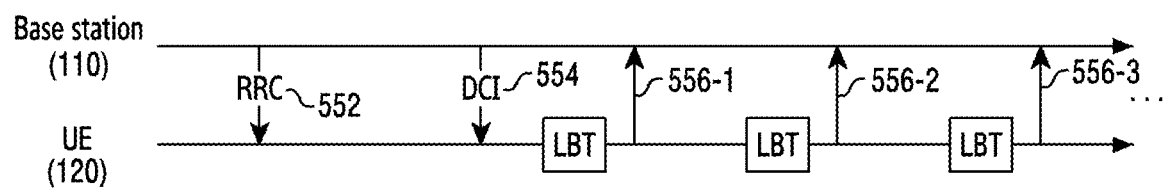
FIG. 5B illustrates an example of an autonomous uplink (AUL) transmission procedure in a wireless communication system according to various embodiments of the disclosure.

Referring to FIG. 4B, an LAA system may operate in a carrier aggregation scheme in which a licensed band is configured as a primary carrier 450 and an unlicensed band is configured as a secondary carrier 452. For example, a UE 120 may establish a radio resource control (RRC) connection with a base station through the primary carrier 450 in the licensed band and may perform control signaling for transmitting and receiving control information. When the LAA system occupies a channel in the unlicensed band, the UE 120 may transmit and receive control information and data over the secondary carrier 452 in the unlicensed band. In various embodiments, an NR-U system, in which NR is applied to an unlicensed band, may also operate in a carrier aggregation scheme as described above. Here, a non-standalone (NSA) scenario, in which a primary carrier operates for an LAA system and a secondary carrier operates for the NR-U system, a standalone (SA) scenario, in which both the primary carrier and the secondary carrier operate for an NR-U network, and a scenario in which the NR-U system operates only in the unlicensed band without any assistance from a licensed band so that control information and data are transmitted and received between a UE and a base station in the unlicensed band may be considered. In various embodiments, in order to maintain the performance of a primary system, which existed before sharing an unlicensed band was allowed, for example, a Wi-Fi system, even in a sharing environment, a secondary system, for example, an LAA/NR-U system, needs to be able to access the unlicensed band using a coexistence technique. Here, the coexistence technique may include LBT of the European Telecommunications Standards Institute (ETSI). A UE or a base station of the LAA/NR-U system occupying a channel through LBT may transmit uplink or downlink traffic by time-division duplexing (TDD) during a channel occupation time. For uplink data transmission, the base station may perform an uplink scheduling procedure for the UE to transmit uplink data. Here, the base station may allocate a resource for autonomous uplink (AUL) transmission of the UE, and the UE may access an uplink channel. FIG. 5A and FIG. 5B described below illustrate a procedure for scheduled uplink (SUL) transmission and autonomous uplink transmission performed by a base station and a UE.

FIG. 5A illustrates an example of a scheduled uplink transmission procedure in a wireless communication system according to various embodiments of the disclosure.

Referring to FIG. 5A, although not shown in FIG. 5A, a UE 120 may perform uplink LBT and may then transmit a scheduling request (SR) to a base station in order to be allocated an uplink resource. Upon receiving the scheduling request, the base station 110 may perform downlink LBT. In one embodiment, the downlink LBT may be performed by a method of performing LBT through random backoff in a contention window having a variable size (e.g., category-4 LBT). After performing the downlink LBT and transmitting an initial signal, the base station may transmit downlink control information (DCI) 502 including an uplink grant to the UE 120. In various embodiments, the initial signal is a signal for channel access identification, and may refer to a predetermined sequence as a dummy signal or a signal including control information about data to be subsequently transmitted. In one embodiment, the uplink grant may indicate an allocated uplink resource, and the uplink resource may refer to dynamically allocated frequency and time resources. The base station 110 transmitting the DCI 502 may also transmit downlink data 504-1, 504-2, and 504-3. Upon receiving the uplink grant, the UE 120 may perform uplink LBT in order to occupy the allocated uplink resource. In one embodiment, the uplink LBT may be performed by a method of performing LBT without random backoff (e.g., category-2 LBT). After performing the uplink LBT, the UE 120 may transmit uplink data 506-1, 506-2, and 506-3. In one embodiment, the uplink resource allocated to the UE 120 may be allocated during a COT period after the downlink LBT by the base station 110. That is, the uplink resource allocated to the UE 120 may be included in the COT period. As described above, a mode of transmitting uplink data through an uplink LBT procedure of the UE 120 after a downlink LBT procedure of the base station 110 may be defined as scheduled uplink transmission. In some embodiments, in a scheduled uplink transmission mode, downlink LBT of the base station 110 and uplink LBT of the UE 120 are frequently performed, thus causing a delay in channel access. In order to overcome this disadvantage of the scheduled uplink transmission mode, the base station may perform scheduling such that the UE transmits data through an autonomous uplink transmission mode.

FIG. 5B illustrates an example of an autonomous uplink transmission procedure in a wireless communication system according to various embodiments of the disclosure.

Figure 6:
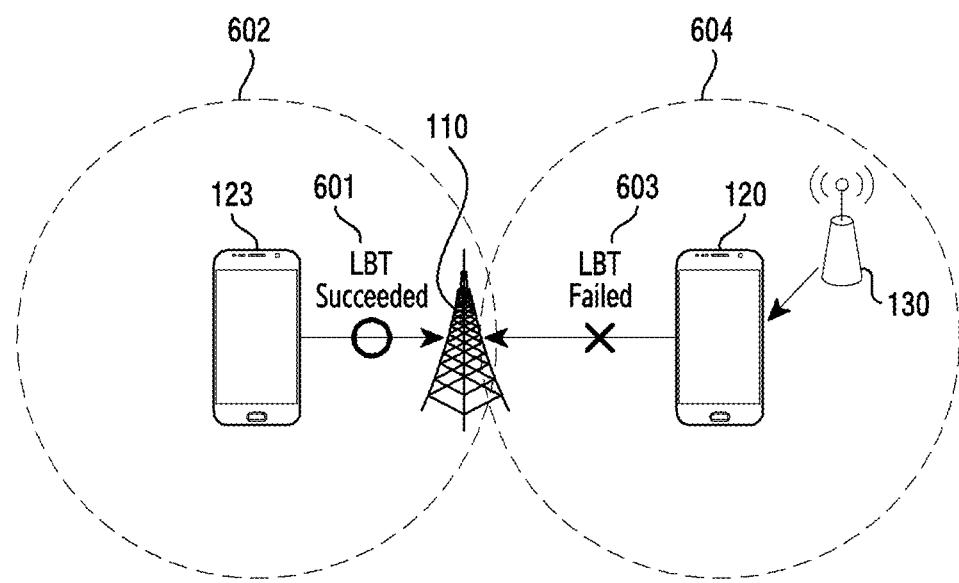
FIG. 6 illustrates an example in which uplink channel access is uncertain in a wireless communication system according to various embodiments of the disclosure.

Referring to FIG. 5B, an autonomous uplink transmission mode uses the concept of semi-persistent scheduling (SPS) of an LTE system, and may refer to a scheme in which a base station periodically allocates a preconfigured time resource rather than performing a complicated procedure for allocating an uplink resource to a UE each time. For example, the base station 110 may transmit information about a time resource allocated to the UE 120 through RRC signaling 552. Here, the time resource may refer to a resource predetermined through an SPS scheme. Subsequently, the base station 110 may transmit information about an allocated frequency resource and a modulation and coding scheme (MCS) through DCI 554. This information may be transmitted through RRC signaling, and the allocated frequency resource may refer to a dynamically allocated resource. The UE 120 may identify whether a channel is currently occupied or free through uplink LBT in order to use the resources for autonomous uplink transmission allocated by the base station 110. After performing the uplink LBT, the UE 120 may transmit uplink data 556-1, 556-2, and 556-3 to the base station 110. Compared to the scheduled uplink transmission mode, the autonomous uplink transmission mode can reduce the delay time of the UE and overhead of LBT required for channel access. However, when the channel is occupied by an external node, such as a Wi-Fi node, and thus the LBT procedure by the UE fails, an uplink resource already allocated to the UE may be wasted. FIG. 6 described below illustrates a problem incurred by uncertainty in uplink channel access of the UE.

FIG. 6 illustrates an example in which uplink channel access is uncertain in a wireless communication system according to various embodiments of the disclosure.

Figure 7A:
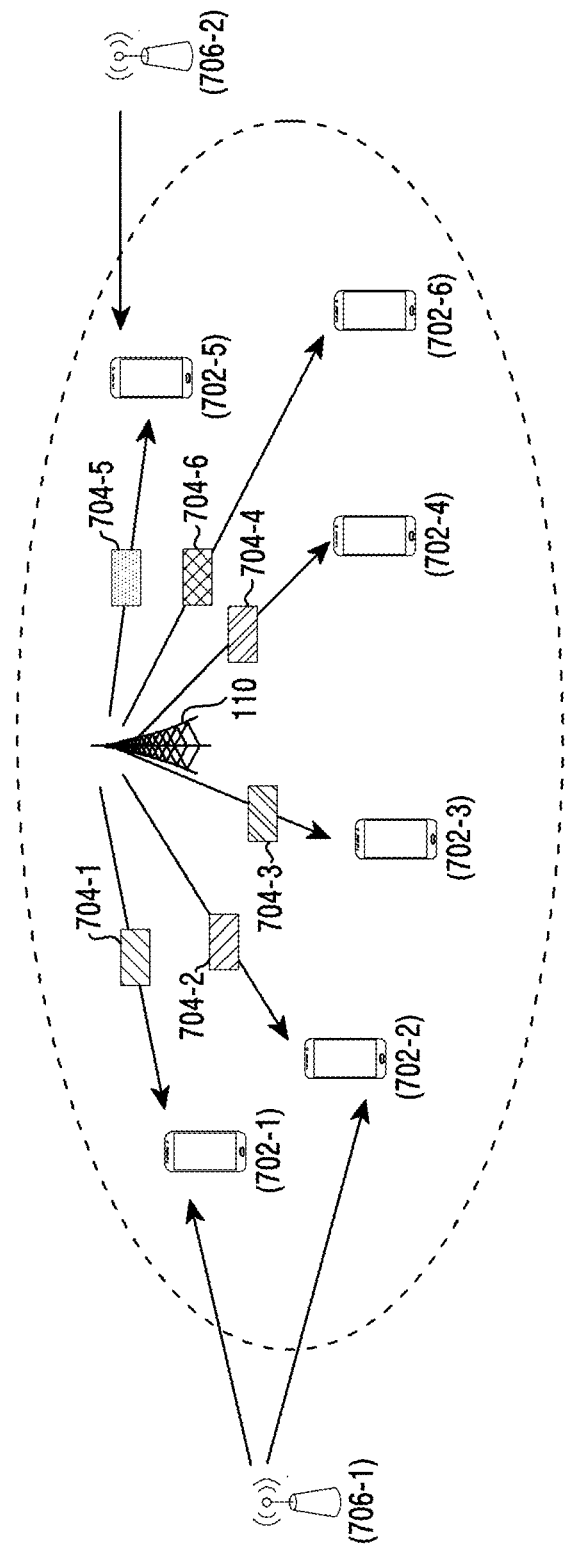
FIG. 7A illustrates an example of uplink resource scheduling in the case where an overbooked uplink (OUL) scheme is not applied in a wireless communication system according to various embodiments of the disclosure.
Figure 7B:
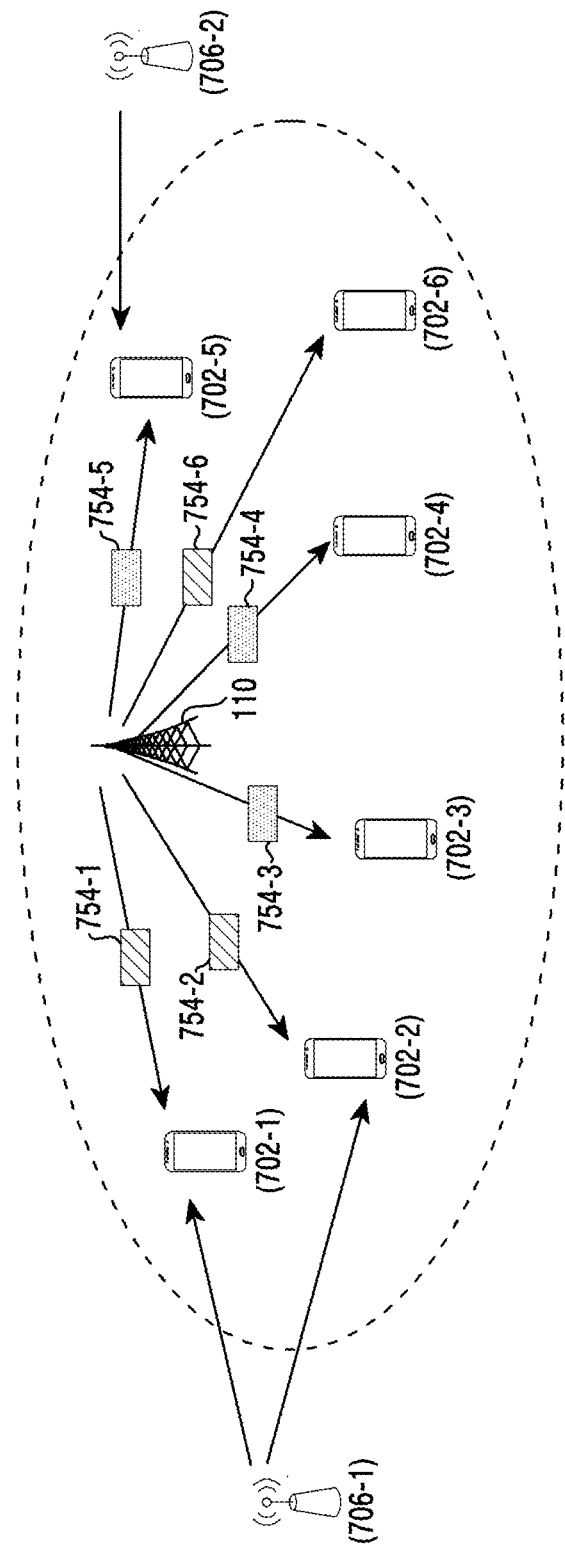
FIG. 7B illustrates an example of uplink resource scheduling in the case where an overbooked uplink scheme is applied in a wireless communication system according to various embodiments of the disclosure.

Referring to FIG. 6, a base station 110 may allocate resources for autonomous uplink transmission to a UE 120 and a UE 123. Here, although not shown in FIG. 6, since a node 130 is not included in a detection area (e.g., a clearing area or sensing area) of the base station, the base station 110 may not recognize the existence of the node 130. After the resources for autonomous uplink transmission are allocated to the UEs, the UE 123 may identify that there is no interference node in a sensing region 602 for uplink LBT, and may succeed (601) in uplink LBT. However, the UE 120 can identify that the node 130 exists in a sensing area 640 for uplink LBT and may fail (603) in uplink LBT to the base station 110. Here, the node 130 may be referred to as a hidden interferer with the base station 110. Due to such uncertainty in uplink channel access, resource utilization efficiency (RUE) and capacity may be seriously reduced. In order to resolve deterioration in uplink performance, an overbooked uplink (OUL) scheme may be used. In various embodiments, an overbooked uplink transmission scheme may be allocation of the same resource for uplink transmission to a plurality of UEs. FIG. 7A and FIG. 7B described below illustrate an example of uplink resource scheduling according to whether an overbooked uplink scheme is applied.

FIG. 7A illustrates an example of uplink resource scheduling in the case where an overbooked uplink (OUL) scheme is not applied in a wireless communication system according to various embodiments of the disclosure.

Referring to FIG. 7A, a base station 110 may allocate resources for uplink transmission to UE 1 702-1 to UE 6 702-6. Here, the base station 110 may allocate different resources to the respective UEs. For example, the base station 110 may allocate a resource 704-1 to the UE 702-1, a resource 704-2 to the UE 702-2, a resource 704-3 to the UE 702-3, a resource 704-4 to the UE 702-4, a resource 704-5 to the UE 702-5, and a resource 704-6 to the UE 702-6. Here, the resources 704-1 to 704-6 allocated to the respective UEs may be different time and frequency resources. When a first interference node 706-1 acts as a hidden interferer with the UE 702-1 and the UE 702-2 and a second interference node 706-2 acts as a hidden interferer with the UE 702-5, the UE 702-1 cannot perform uplink transmission via the resource 704-1, the UE 702-2 cannot perform uplink transmission via the resource 704-2, and the UE 702-5 cannot perform uplink transmission via the resource 704-5. As a result, the resources allocated to the UEs may be wasted due to the hidden interference nodes.

FIG. 7B illustrates an example of uplink resource scheduling in the case where an overbooked uplink scheme is applied in a wireless communication system according to various embodiments of the disclosure.

Referring to FIG. 7B, a base station 110 may allocate resources for uplink transmission to UE 1 702-1 to UE 6 702-6. In this case, the base station 110 may allocate the same resources to the UEs. For example, the base station 110 may allocate a resource 754-1 to the UE 702-1, a resource 754-2 to the UE 702-2, and a resource 754-6 to the UE 702-6, where the resource 754-1, the resource 754-2, and the resource 754-6 may indicate resources allocated in the same time-frequency region. In addition, the base station 110 may allocate a resource 754-3 to the UE 702-3, a resource 754-4 to the UE 702-4, and a resource 754-5 to the UE 702-5, where the resource 754-3, the resource 754-4, and the resource 754-5 may indicate resources allocated in the same time-frequency region. As described above, the same resource for uplink transmission may be allocated to multiple UEs, thereby avoiding the waste of resources described in connection with FIG. 7A. For example, when a first interference node 706-1 acts as a hidden interferer with the UE 702-1 and the UE 702-2 and a second interference node 706-2 acts as a hidden interferer with the UE 702-5, even though the UE 702-1, the UE 702-2, and the UE 702-6 fail to perform uplink transmission using the allocated resource, the UE 702-6 may perform uplink transmission via the resource 754-6, and the UE 702-3 and the UE 702-4 may perform uplink transmission via the resource 754-3 and the resource 754-4, respectively, thereby avoiding the waste of resources due to the hidden interferers. When the overbooked uplink scheme is applied, diversity gain that enables channel access opportunities to be provided to a plurality of UEs may be obtained. Accordingly, the probability of successful uplink channel access by a UE may be increased, resulting in increases in overall uplink resource utilization efficiency and in system capacity.

Figure 8:
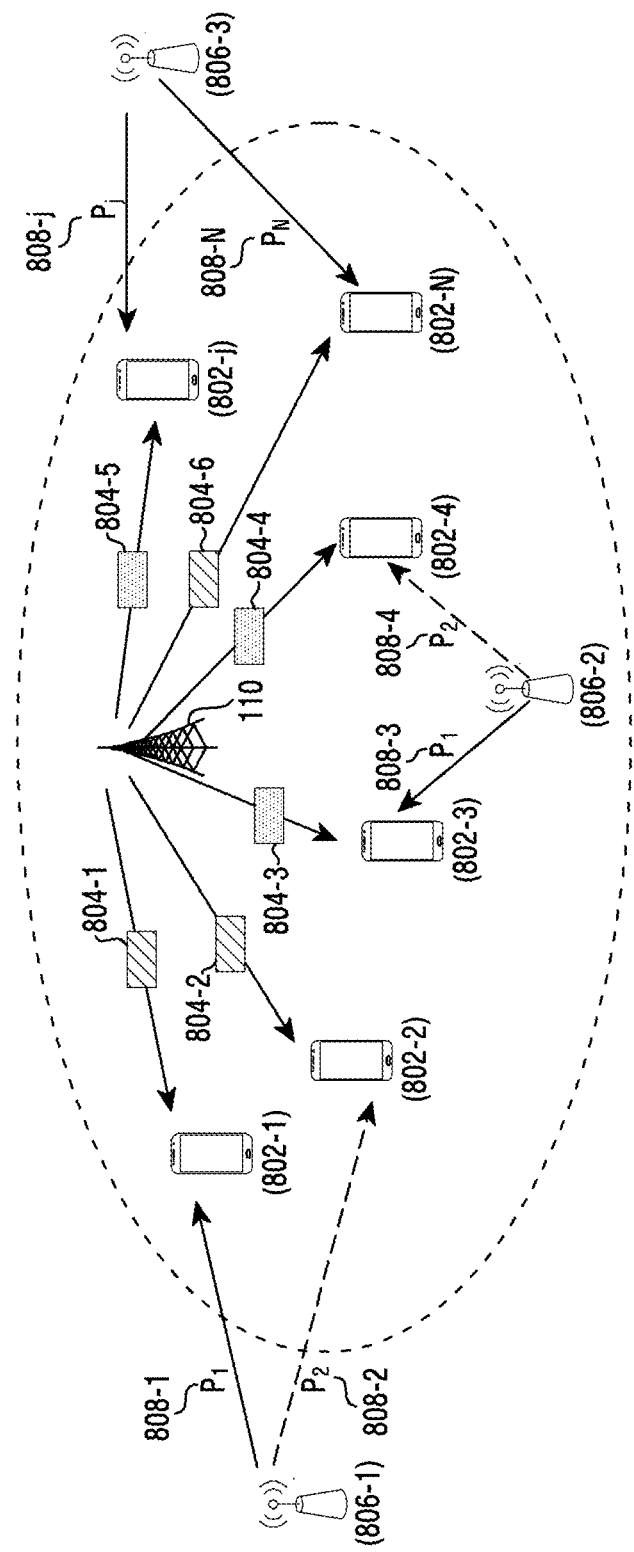
FIG. 8 illustrates an example of an NR-U system in the case where an overbooked uplink scheme is applied in a wireless communication system according to various embodiments of the disclosure.

FIG. 8 illustrates an example of an NR-U system in the case where an overbooked uplink scheme is applied in a wireless communication system according to various embodiments of the disclosure.

Referring to FIG. 8, a base station 110 may allocate overbooked resources for uplink transmission to N UEs 802-1 to 802-N. For example, the base station 110 may allocate a resource 804-1 to the UE 802-1, a resource 804-2 to the UE 802-2, a resource 804-3 to the UE 802-3, a resource 804-4 to the UE 802-4, a resource 804-j to the UE 802-j, and a resource 804-N to the UE 802-N. Here, the resource 804-1, the resource 804-2, and the resource 804-N may indicate resources allocated in the same time-frequency region, and the resource 804-3, the resource 804-4, and the resource 804-j may indicate resources allocated in the same time-frequency region. The resource 804-1, the resource 804-2, and the resource 804-N may be orthogonal to the resource 804-3, the resource 804-4, and the resource 804-j. Each of the UEs may receive random interference from an interference node. In one embodiment, a UE receiving interference from an interference node may mean that an interferer existing in a sensing area of the UE is activated to occupy a channel when the UE performs uplink LBT to use an uplink resource allocated by a base station. For example, the UE 802-1 may receive interference from a first interference node 806-1 with a probability of $p_1$ 808-1, and the UE 802-2 may receive interference from the first interference node 806-1 with a probability of $p_2$ 808-2. Further, the UE 802-3 may receive interference from a second interference node 806-2 with a probability of $p_3$ 808-3, and the UE 802-4 may receive interference from the second interference node 806-2 with a probability of $p_4$ 808-4. In addition, the UE 802-j may receive interference from a third interference node 806-3 with a probability of $p_j$ 808-j, and the UE 802-N may receive interference from the third interference node 806-3 with a probability of $p_N$ 808-N. In various embodiments, the interference $\{p_1, p_2, \ldots, p_N\}$ that the UEs may receive from the interference nodes may be indicated to the base station through measurement and feedback by the UEs. In various embodiments, $\{p_1, p_2, \ldots, p_N\}$ may indicate the probabilities that the respective UEs fail in uplink LBT as an uplink channel for the UEs is occupied by an interferer. In order to effectively apply the overbooked uplink scheme in the above system, the following aspects need to be taken into consideration. For example, it is required to group the UEs to achieve the greatest diversity gain in UE grouping, to minimize signaling overhead in resource allocation, to guarantee fairness to the UE in channel access, and to minimize collisions between UEs simultaneously accessing a channel in a UE group using the same resource. With regard to the considerations, a conventional uplink resource allocation and channel access procedure and problems thereof are described below.

In general, an uplink resource allocation procedure in an LAA system is illustrated as follows. In the LAA system, a base station may allocate a cell radio network temporary identifier (C-RNTI) to each UE and may transmit an uplink grant through DCI. In this case, the uplink grant may include information about resource allocation, a hybrid automatic repeat request (HARD), and an MCS. Since DCI is coded with the C-RNTI of a UE, each UE may perform blind decoding of DCI thereof through the C-RNTI. In the LAA system, the base station may allocate an orthogonal resource to each UE, and fairness to UEs in channel access may be guaranteed by adjusting the quantity of time and frequency resources. After performing uplink resource allocation as described above, an uplink channel access procedure may be performed as follows. First, the UE may perform uplink LBT before an uplink resource allocated by the base station. In this case, if the average strength of signals received via a channel in an unlicensed band is lower than a particular threshold value, the UE may occupy the channel. In various embodiments, in order to occupy the channel, the UE may perform clear channel assessment (CCA) in one slot (e.g., category-2 LBT) or may perform CCA in a plurality of slots generated through random back-off (e.g., category-4 LBT). When the overbooked uplink scheme is not applied, orthogonal resources are allocated to UEs, thus preventing two more UEs from simultaneously accessing the same resource in channel access. When the conventional uplink resource allocation procedure and channel access procedure in the LAA system described above are applied to the overbooked uplink scheme of the disclosure, the following problems may occur.

First, when control signaling for resource allocation is performed, unnecessary overhead may occur. Specifically, in the conventional LAA system, in order to indicate the position of an uplink resource to each UE, the base station may code cyclic redundancy check (CCR) bits of DCI with the C-RNTI of the UE. The UE may decode pieces of DCI using the C-RNTI thereof, thereby identifying the DCI allocated thereto. Through this process, the base station may schedule orthogonal uplink resources to respective UEs. Here, DCI format 0 used for allocating an uplink grant may be configured with up to 34 bits, and may include various control information elements (IEs). For example, the control information elements may include information about resource allocation, and 13 bits may be used for frequency resource allocation based on a bandwidth of 20 MHz. When the foregoing uplink scheduling method using DCI transmission is applied to an overbooked uplink scenario according to the disclosure, the base station needs to transmit as many pieces of DCI as the number of UEs in order to allocate the same resource to a UE group, and thus unnecessary overhead may occur in signaling for resource allocation. In various embodiments, in addition to the information element used for frequency resource allocation, DCI format 0 may include a 5-bit information element for indicating an MCS and a redundancy version (RV), a 1-bit information element for a new data indicator (NDI), a 2-bit information element for indicating transmit power control (TPC) for a physical uplink shared channel (PUSCH), and a 2-bit information element for indicating a quality of service (QoS) request.

Further, a fairness issue may occur to UEs in a group in resource allocation. Generally, in the conventional LAA system, the base station allocates an orthogonal resource to each UE. Thus, when a particular UE cannot process traffic because a channel is frequently occupied by an interference node (e.g., a Wi-Fi node), the base station may allocate more time and frequency resources to the UE, thereby guaranteeing fairness to UEs in resource allocation. However, in the overbooked uplink scheme according to the disclosure, since the base station cannot allocate an orthogonal resource only to a particular UE, fairness to UEs may not be guaranteed with the conventional technique.

Figure 9:
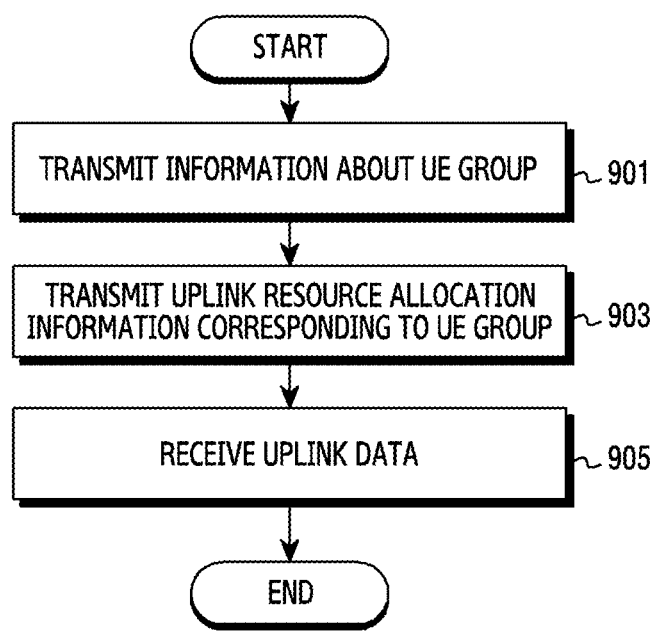
FIG. 9 illustrates a flowchart of a base station in a wireless communication system according to various embodiments of the disclosure.
Figure 10:
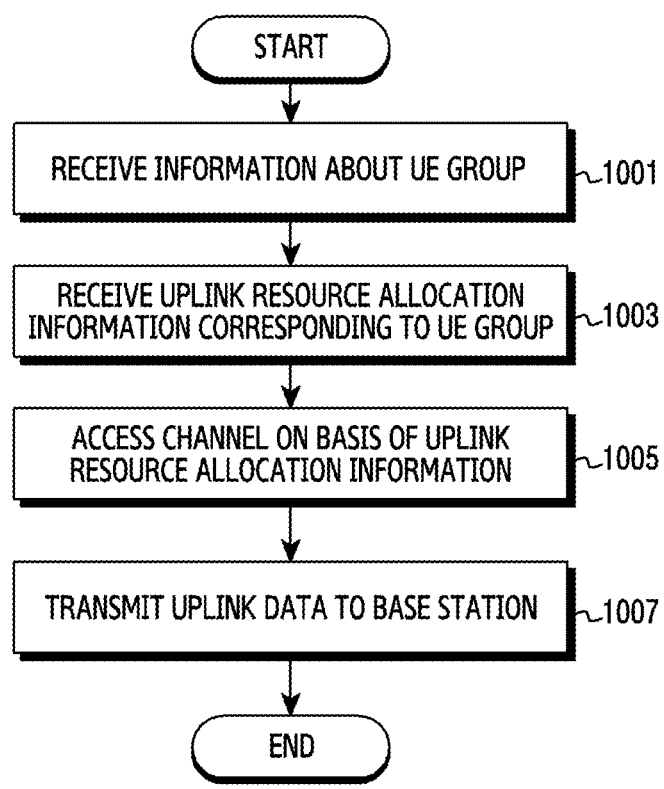
FIG. 10 illustrates a flowchart of a UE in a wireless communication system according to various embodiments of the disclosure.

In addition, a collision issue may occur to UEs in a group in signal detection and uplink channel access. Generally, in the conventional LAA system, the base station may allocate an orthogonal resource to each UE, and each UE may perform LBT in order to acquire the allocated resource. Here, since resources allocated to respective UEs are orthogonal, a collision due to two or more UEs simultaneously accessing the same resource may not occur. However, in the overbooked uplink scheme according to the disclosure, since a plurality of UEs accesses the same resource in the channel access procedure, a collision may occur between UEs in channel access. Thus, in an embodiment according to the disclosure, the UE needs to detect not only an interference node, such as a Wi-Fi node, but also a signal of a UE in the group through uplink LBT. However, since other UEs in the group to which the UE belongs act as hidden interferers to each other, the UE may have difficulty in detecting the other UEs in the group using the threshold value used for energy detection (ED) in the uplink LBT. Here, when the threshold value is set to a value lower than the current value in order to improve the capability to detect the other UEs in the group, the UE may sensitively perform the LBT, thus more frequently incurring waste of resources due to the occupancy of the channel by the interference node. In order to solve the foregoing problems that occur when the overbooked uplink scheme is applied in the conventional LAA system, control signaling between the base station and the UE may be newly defined. FIG. 9 and FIG. 10 described below illustrate a procedure performed in a base station and a UE to solve the problems.

FIG. 9 illustrates a flowchart of a base station in a wireless communication system according to various embodiments of the disclosure. FIG. 9 illustrates an operating method of the base station 110 in FIG. 1.

Referring to FIG. 9, in operation 901, the base station transmits information about a UE group. Although not shown in FIG. 9, the base station may be fed back with information about the interference state of a UE measured by the UE from the UE. Subsequently, the base station may group UEs using the information fed back from the UE, and may set a group identifier (GID) for each group. The base station may transmit information about a UE group including the group identifier to the UE.

In operation 903, the base station transmits uplink resource allocation information corresponding to the UE group. That is, the base station may allocate resources for overbooked uplink transmission to the UEs and may provide information about the allocated resources to the UE. For example, the base station may perform resource scheduling for UE groups and resource scheduling for UEs in a UE group, and may transmit an uplink grant including information about an allocated resource to a UE.

In operation 905, the base station receives uplink data. For example, the base station may receive an initial signal from the UE that first occupied a channel for an uplink among at least one UE in a UE group and may subsequently receive uplink data from the UE. In various embodiments, the initial signal transmitted by the UE may include information about the UE so that the base station can identify which UE in the group occupied the channel first. The base station may decode the received uplink data using the information about the UE.

FIG. 10 illustrates a flowchart of a UE in a wireless communication system according to various embodiments of the disclosure. FIG. 10 illustrates an operating method of the UE 120 in FIG. 1.

Referring to FIG. 10, in operation 1001, the UE receives information about a UE group. Although not shown in FIG. 10, the UE may measure the interference state of the UE and may transmit information about the interference state of the UE to a base station. Subsequently, the UE may receive information about a UE group including a group identifier of a group including the UE from the base station. In one embodiment, the group including the UE may be determined on the basis of the information about the interference state of the UE.

In operation 1003, the UE receives uplink resource allocation information corresponding to the UE group. That is, the UE may receive information about a resource for overbooked uplink transmission from the base station, in which the resource may be allocated by the base station. In various embodiments, the UE may receive, from the base station, an uplink grant including information about a resource allocated through resource scheduling for UE groups and information about a resource allocated through resource allocation for UEs in a UE group.

In operation 1005, the UE performs channel access on the basis of the uplink resource allocation information. For example, the UE may determine a contention slot for performing channel access. In various embodiments, the UE may receive information about the contention slot from the base station. After determining the contention slot, the UE may perform uplink LBT using a two-level threshold value in the contention slot. In various embodiments, the two-level threshold value may include a first threshold value for detecting a signal from an interference node and a second threshold value for detecting a signal from another UE in the group.

In operation 1007, the UE transmits uplink data to the base station. Although not shown in FIG. 10, the UE may first occupy a channel for an uplink among at least one UE in the group in a channel access procedure and may transmit an initial signal. Subsequently, the UE may transmit uplink data via time and frequency resources allocated by the base station. Here, the initial signal transmitted by the UE may include information about the UE.

When the base station groups UEs as described above, the base station may select and group UEs having different interferers as interference in order to maximize the diversity gain of each group. To this end, in a UE grouping procedure using the overbooked uplink scheme, each UE may measure pieces of information necessary for distinguishing UEs having different interferers and may report the pieces of information to the base station. The base station may group UEs using the reported pieces of information, and may transmit information about which group each UE is included into each UE. Below, FIG. 11 illustrates a specific procedure performed in a base station when UE grouping is performed.

Figure 11:
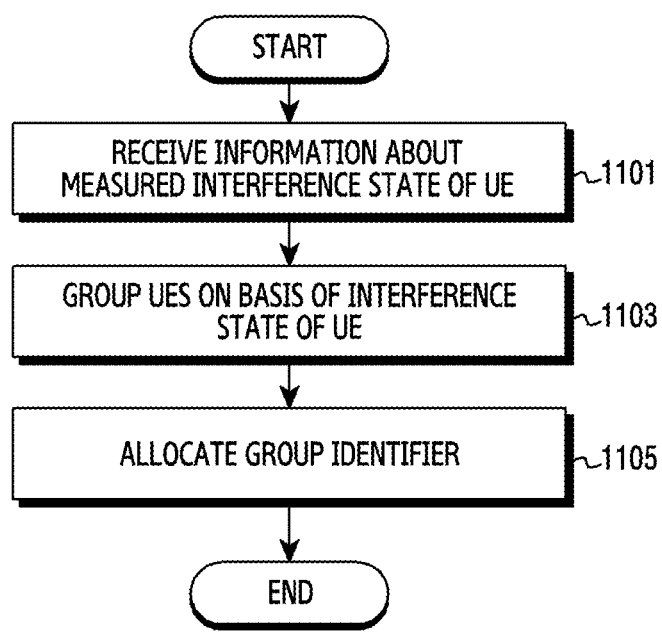
FIG. 11 illustrates a flowchart of a base station grouping UEs in a wireless communication system according to various embodiments of the disclosure.

FIG. 11 illustrates a flowchart of a base station grouping UEs in a wireless communication system according to various embodiments of the disclosure. FIG. 11 illustrates an operation method of the base station 110 in FIG. 1.

Referring to FIG. 11, in operation 1101, the base station receives information about the measured interference state of a UE. In various embodiments, the UE may measure the interference state of the UE in a measurement period configured by the base station. Here, the interference state of the UE may be the degree or probability with which at least one slot assigned in the measurement period is occupied by an interferer, and may be referred to as a channel-blocking state. In various embodiments, the interference state of the UE may include an uplink clear channel assessment blocking probability (UCBP). The base station may receive information about a UCBP value measured in UCBP measurement slots.

In operation 1103, the base station performs UE grouping on the basis of the interference state of the UE. For example, the base station may group UEs on the basis of information about the interference state of the UEs received from the UEs. The base station may group UEs having different interferers into a group, thereby maximizing diversity gain.

In operation 1105, the base station allocates a group identifier. For example, the base station may classify UEs into groups through a grouping procedure and may then allocate a group identifier for each group. Subsequently, the base station may transmit the allocated group identifier to UEs included in each group through a control message. In various embodiments, a different group identifier may be allocated to each group and may be used in a resource allocation procedure.

Figure 12A:
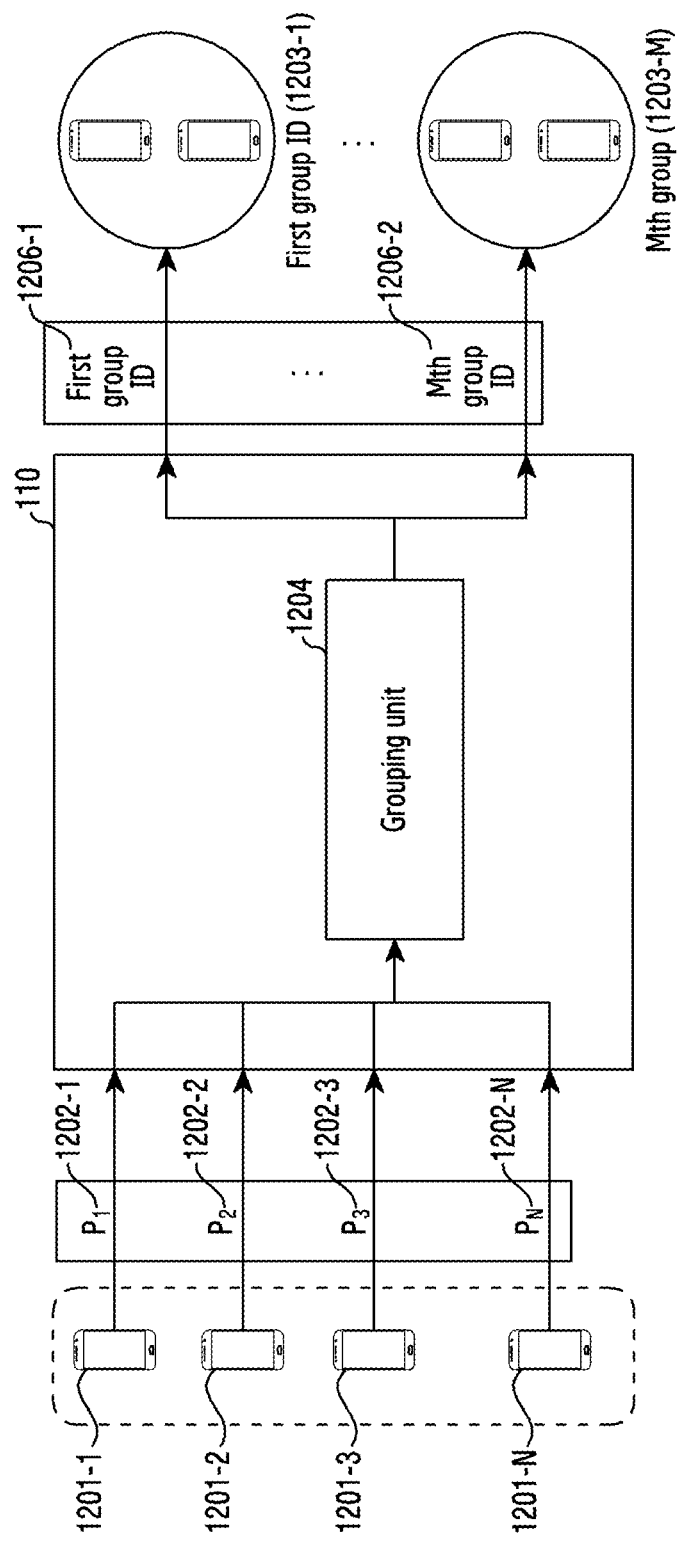
FIG. 12A illustrates a conceptual diagram of a procedure for grouping UEs in a wireless communication system according to various embodiments of the disclosure.

FIG. 12A illustrates a conceptual diagram of a procedure for grouping UEs in a wireless communication system according to various embodiments of the disclosure.

Referring to FIG. 12A, each of a first UE 1201-1, a second UE 1201-2, a third UE 1201-3, and an Nth UE 1201-N may measure the interference state of the UE and may transmit information about the interference state to the base station 110. For example, the first UE 1201-1 may transmit a UCBP value $P_1$ 1202-1 to the base station 110, the second UE 1201-2 may transmit a UCBP value $P_2$ 1202-2 to the base station 110, the third UE 1201-3 may transmit a UCBP value $P_3$ 1202-3 to the base station 110, and the Nth UE 1201-N may transmit a UCBP value $P_N$ 1202-N to the base station 110. A grouping unit 1204 of the base station 110 may receive the UCBP values and may classify the UEs into groups according to the UCBP values. For example, the grouping unit 1204 may classify N UEs into M groups $\{G_1, G_2, \ldots, G_M\}$. In one embodiment, UEs in the same group may receive interference from the same interferer, and UEs in different groups may receive interference from different interferers. After grouping, the grouping unit 1204 may allocate a group ID to each group and may transmit the group ID to each group. For example, the grouping unit 1204 may transmit a first group ID 1206-1 to a first group 1203-1 and an Mth group ID (ID of group M) 1206-2 to an Mth group (group M) 1203-M.

Figure 12B:
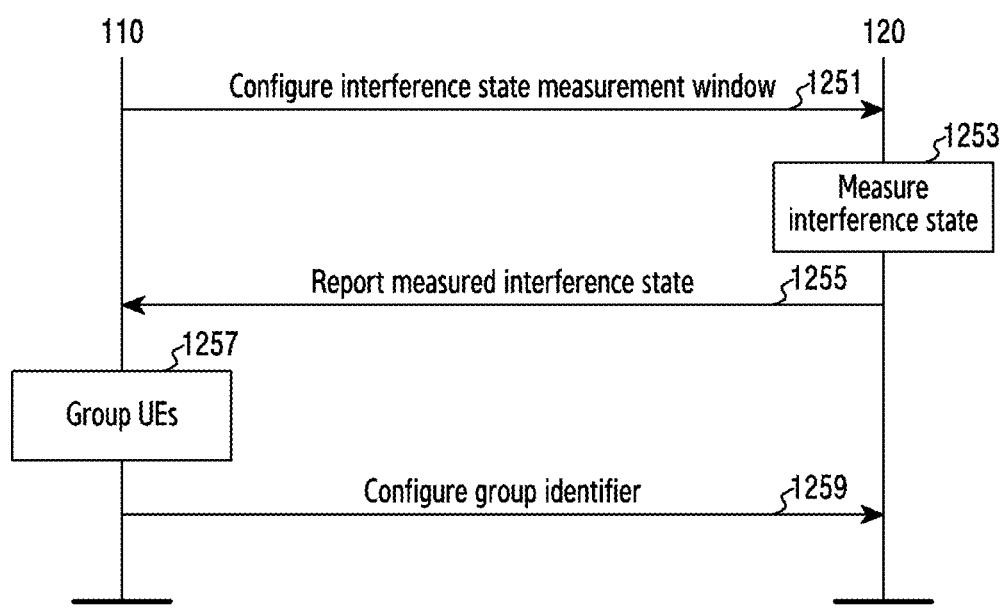
FIG. 12B illustrates a sequence diagram of a procedure for grouping UEs in a wireless communication system according to various embodiments of the disclosure.

FIG. 12B illustrates a sequence diagram of a procedure for grouping UEs in a wireless communication system according to various embodiments of the disclosure. FIG. 12B illustrates an operating method of the base station 110 and the UE 120 in FIG. 1. For reference, although FIG. 12B illustrates the UE 120, the UE is not limited thereto. According to various embodiments of the disclosure, the UE 120 may be changed to a plurality of UEs.

Referring to FIG. 12B, in operation 1251, the base station configures an interference state measurement window for a UE. For example, the base station may configure a window for UCBP measurement and may transmit information on the measurement window to the UE. The window for UCBP measurement may include at least one slot for UCBP measurement.

In operation 1253, the UE may measure an interference state. For example, the UE may perform CCA in the at least one slot for UCBP measurement configured by the base station. In various embodiments, after performing the CCA, the UE may calculate the ratio of slots determined to be occupied among the at least one slot configured by the base station, thereby determining the UCBP of the UE.

In operation 1255, the UE reports the measured interference state. For example, the UE may report a measured UCBP value to the base station through a control message at a time set by the base station.

In operation 1257, the base station performs UE grouping. For example, the base station may perform UE grouping to select UEs having different interferers on the basis of information reported from the UE.

In operation 1259, the base station configures a group identifier. For example, the base station may allocate a group identifier for each group classified through a grouping procedure. In various embodiments, a different group identifier is allocated to each group. The base station may use a group identifier when allocating an uplink resource to each group in a resource allocation procedure. In various embodiments, in a network environment in which an LAA or NR-U system is supported, a group identifier may refer to a group C-RNTI allocated for a group. In various embodiments, the group C-RNTI may be referred to as a group-based C-RNTI (GC-RNTI). A UE-specific C-RNTI may be used to indicate information about an orthogonal frequency resource for each UE, an MCS, and an HARQ. A GC-RNTI may be used to allocate only the same frequency resources to any UE group, and a different GC-RNTI may be allocated to each group. Subsequently, the base station may transmit the allocated group identifier to UEs included in each group through a control message. In one embodiment, the control message may include an RRC message. Hereinafter, FIG. 13 illustrates a specific procedure in which a UE measures and reports an interference state.

Figure 13:
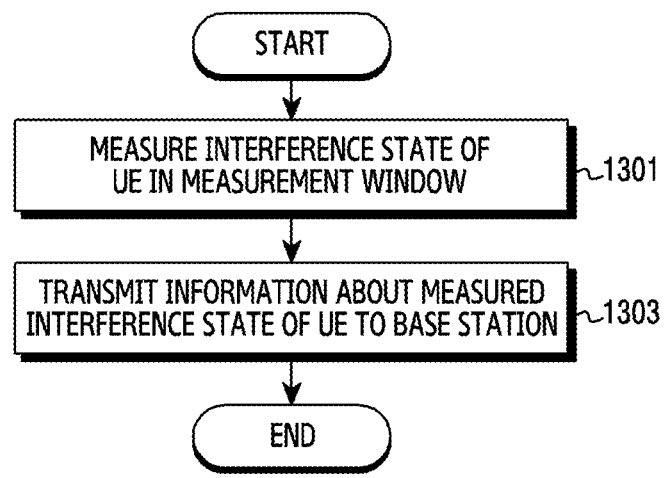
FIG. 13 illustrates a flowchart of a UE measuring the interference state of the UE in a wireless communication system according to various embodiments of the disclosure.

FIG. 13 illustrates a flowchart of a UE measuring the interference state of the UE in a wireless communication system according to various embodiments of the disclosure. FIG. 13 illustrates an operating method of the UE 120 in FIG. 1.

Figure 14A:
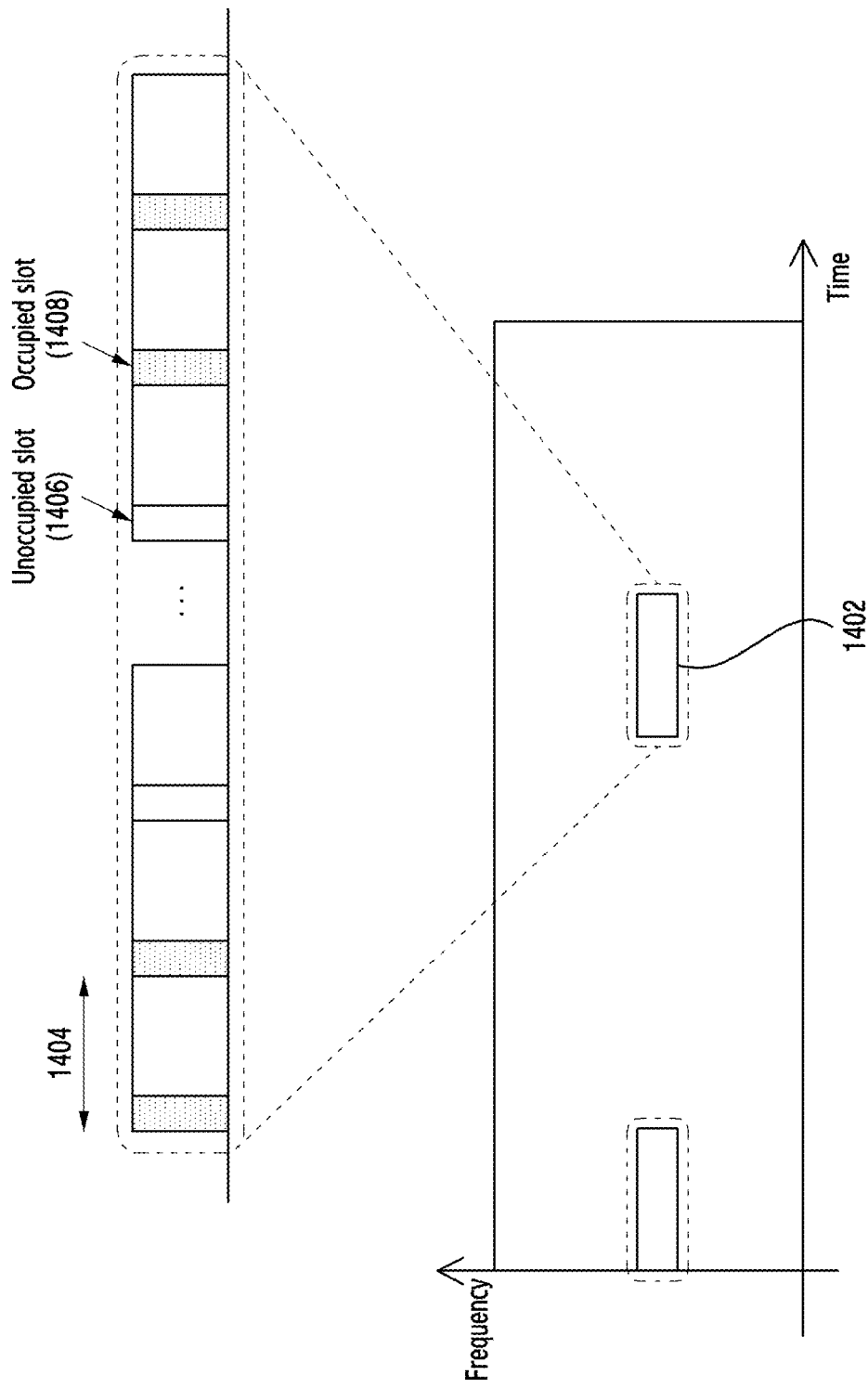
FIG. 14A illustrates an example in which a UE measures an interference state in a wireless communication system according to various embodiments of the disclosure.

Referring to FIG. 13, in operation 1301, the UE measures the interference state of the UE in a measurement window. For example, the UE may perform CCA in the at least one slot for UCBP measurement configured by the base station and may then calculate the average ratio of slots occupied among the at least one slot, thereby measuring the interference state of the UE. To this end, in various embodiments, an LAA or NR-U base station may configure any number of subframes or slots as a UCBP measurement period, where the subframes or slots may include at least one slot for UCBP measurement. The UE may perform the same procedure as that performed in a CCA slot for uplink LBT in the at least one slot for UCBP measurement. For example, the UE may detect energy in the at least one slot for UCBP measurement, and may determine that a corresponding CCA slot is occupied when the detected energy exceeds a predetermined threshold value. When the detected energy is less than the predetermined threshold value, the UE may determine that the CCA slot is unoccupied. When the number of measurement slots included in the window for UCBP measurement is N and the number of measurement slots determined to be occupied is B, UCBP may be calculated to be B/N. In one embodiment, the predetermined threshold value may be −62 dBm. FIG. 14A illustrates an example in which the UE measures the interference state as described above. For example, an Nth measurement window 1402 for UCBP measurement may be configured for the UE by the base station. The measurement window 1402 may include a plurality of slots, and the plurality of slots may be spaced at an interval 1404 between slots. Here, the slots included in the measurement window 1402 may indicate CCA slots, and the CCA slots may indicate a set of OFDM symbols punctured for UCBP measurement. The UE may perform CCA on the slots included in the measurement window 1402. Accordingly, the UE may separate an unoccupied slot 1406 from an occupied slot 1408. The UE may calculate the ratio of occupied slots to the total number of slots included in the measurement window 1402, thereby determining the UCBP of the UE.

Figure 14B:
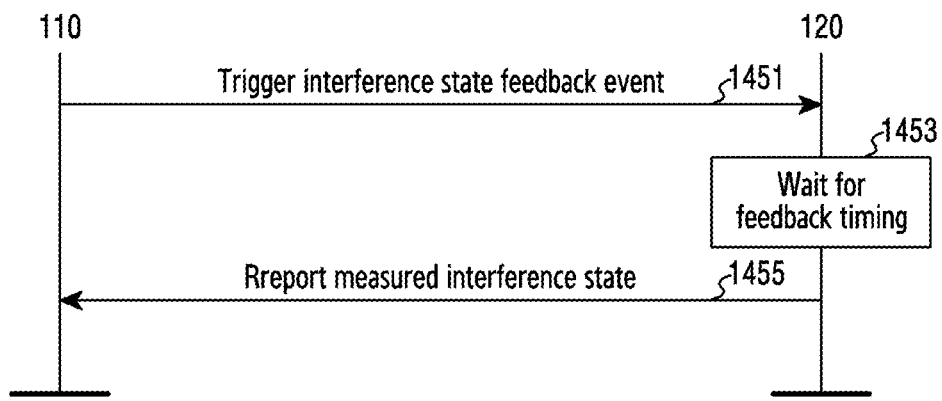
FIG. 14B illustrates a sequence diagram of a procedure in which a UE measures and feeds back an interference state in a wireless communication system according to various embodiments of the disclosure.

In operation 1303, the UE transmits information about the measured interference state of the UE to the base station. For example, the UE may receive a message triggering feedback of measured UCBP information from the base station, and may transmit a feedback message including measured UCBP information to the base station after a certain period of time. FIG. 14B illustrates a sequence diagram of the foregoing procedure in which the UE measures and feeds back the interference state. Referring to FIG. 14B, in operation 1451, the base station triggers an interference state feedback event to the UE. For example, the base station supporting an LAA or NR-U system may transmit a message triggering feedback of measured UCBP information through DCI to the UE. In operation 1453, the UE waits for a feedback timing. For example, the UE, which is triggered to perform feedback in the previous operation, may wait for a processing delay without performing feedback. In operation 1455, the UE reports a measured interference state to the base station. For example, the UE may transmit feedback information including measured UCBP information to the base station through a control message, such as uplink control information (UCI), after the processing delay. As described above, the procedure in which the UE measures and feeds back the interference state may be performed. Hereinafter, FIG. 15A and FIG. 15B illustrate an example of UE grouping performed by a base station after feedback of a UE.

Figure 15A:
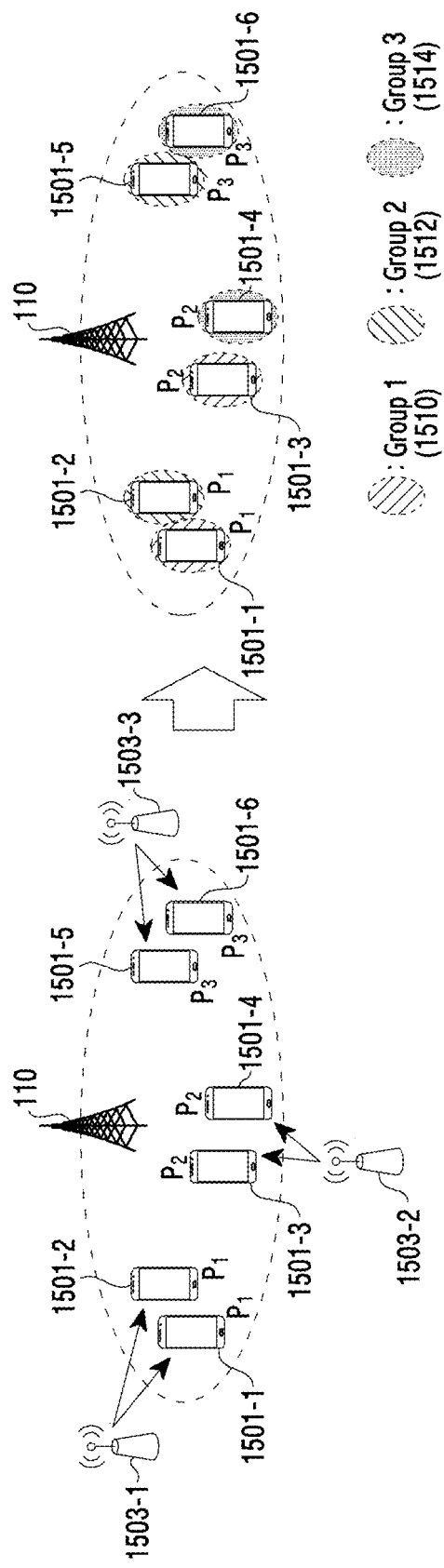
FIG. 15A illustrates an example of UE grouping in a wireless communication system according to various embodiments of the disclosure.

FIG. 15A illustrates an example of UE grouping in a wireless communication system according to various embodiments of the disclosure.

Referring to FIG. 15A, since a UCBP measured by a UE is dependent on the action of an interferer around the UE, a base station may determine that UEs having different UCBPs receive interference from different interferers. Therefore, the base station may group UEs having different UCBPs due to different interferers into a single group, thereby maximizing diversity gain. For example, when a UE 1501-1 and a UE 1501-2 receive interference from a first interfering node 1503-1, a UE 1501-3 and a UE 1501-4 receive interference from a second interfering node 1503-2, and a UE 1501-5 and a UE 1501-6 receive interference from a third interfering node 1503-4, UCBPs measured in the UE 1501-1 and the UE 1501-2 may be $P_1$, UCBPs measured in the UE 1501-3 and the UE 1501-4 may be $P_2$, and UCBPs measured in the UE 1501-5 and the UE 1501-6 may be $P_3$. In this case, in order to group UEs having different interferers into one group, the base station may set the UE 1501-1 and the UE 1501-3 to group 1 1510, may set the UE 1501-2 and the UE 1501-5 to group 2 1512, and may set the UE 1501-4 and the UE 1501-6 to group 3 1514.

Figure 15B:
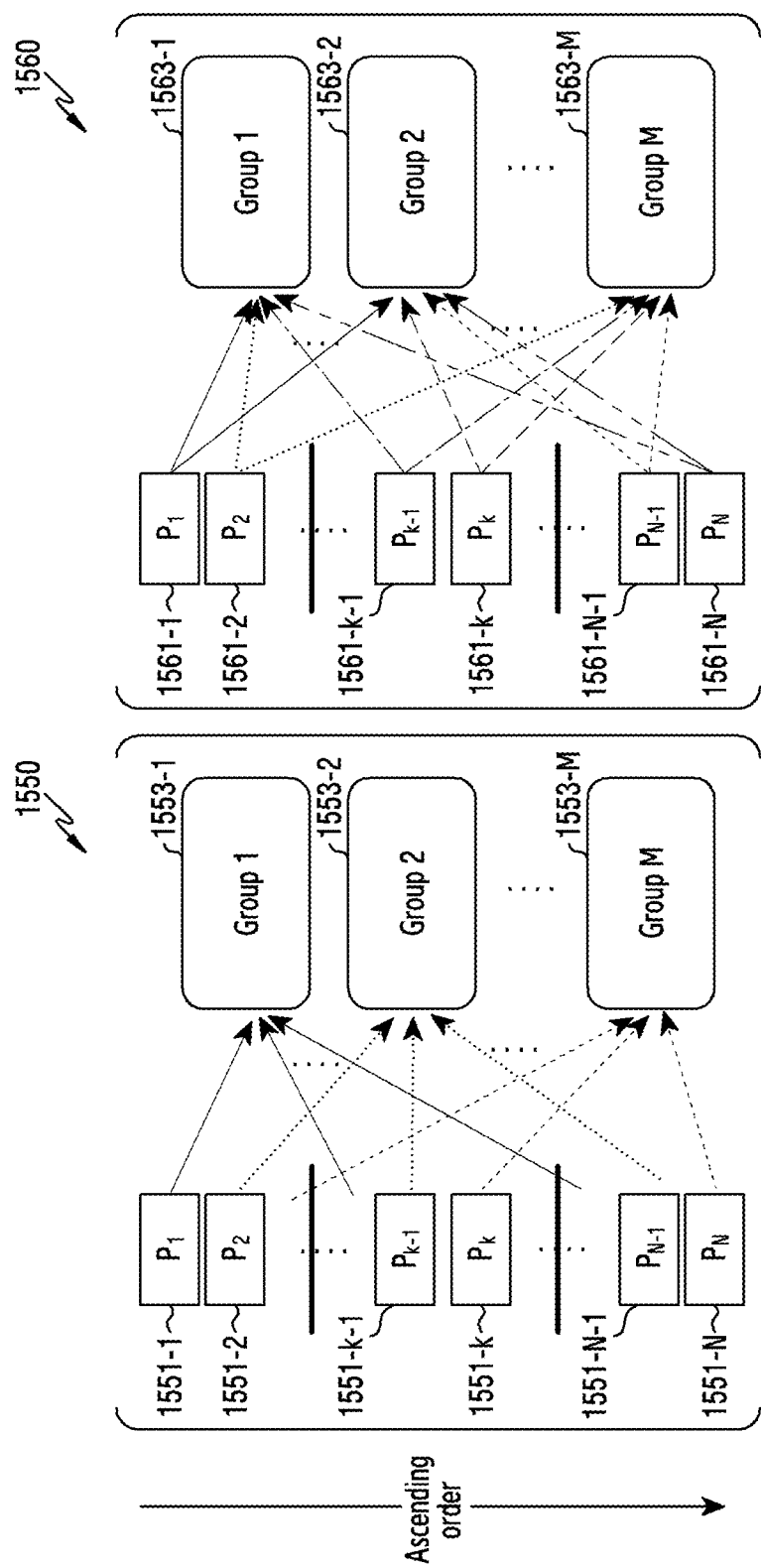
FIG. 15B illustrates an example of a UE-grouping method in a wireless communication system according to various embodiments of the disclosure.

FIG. 15B illustrates an example of a UE-grouping method in a wireless communication system according to various embodiments of the disclosure.

Figure 16:
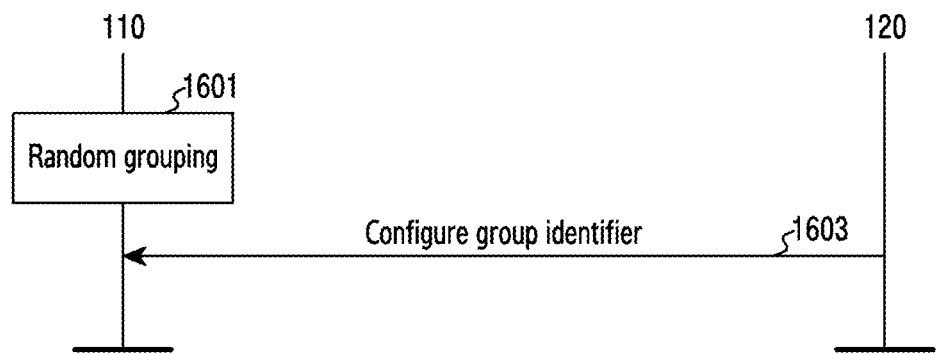
FIG. 16 illustrates a sequence diagram of a UE grouping procedure in random grouping in a wireless communication system according to various embodiments of the disclosure.

Referring to FIG. 15B, when a UCBP value indicating the interference state of a UE is expressed as P and the number of UEs to be grouped into M groups is N, the N UEs may be arranged in ascending order from index 1 to N. For example, a UE 1551-1 having a UCBP value $P_1$, a UE 1551-2 having a UCBP value $P_2$, a UE 1551-$k$-1 having a UCBP value $P_{k-1}$, a UE 1551-$k$ having a UCBP value $P_k$, a UE 1551-N-1 having a UCBP value $P_{N-1}$, and a UE 1551-N having a UCBP value $P_N$ may be arranged in order. In one embodiment, many-to-one UE grouping 1550 may be performed. For example, the UE 1551-1 having the UCBP value $P_1$ may be classified as group 1 1553-1, the UE 1551-2 having the UCBP value $P_2$ may be classified as group 2 1553-2, the UE 1551-$k$-1 having the UCBP value $P_{k-1}$ may be classified as group 2 1553-2, the UE 1551-N-1 having the UCBP value $P_{N-1}$ may be classified as group 2 1553-2, the UE 1551-$k$ having the UCBP value $P_k$ may be classified as group M 1553-M, and the UE 1551-N having the UCBP value $P_N$ may be classified as group M 1553-M. In another embodiment, many-to-many UE grouping 1560 may be performed. For example, the UE 1551-1 having the UCBP value $P_1$ may be classified as group 1 1563-1 and group 2 1563-2, the UE 1551-2 having the UCBP value $P_2$ may be classified as group 1 1563-1 and group M 1563-M, the UE 1551-k-1 having the UCBP value $P_{k-1}$ may be classified as group 1 1563-1 and group M 1563-M, the UE 1551-k having the UCBP value $P_k$ may be classified as group 2 1563-2 and group M 1563-M, the UE 1551-N-1 having the UCBP value $P_{N-1}$ may be classified as group 2 1563-2 and group M 1563-M, and the UE 1551-N having the UCBP value $P_N$ may be classified as group 1 1563-1 and group 2 1563-2. FIG. 16 described below illustrates a random grouping procedure performed when a base station fails to receive the interference state of a UE from the UE.

FIG. 16 illustrates a sequence diagram of a UE grouping procedure in random grouping in a wireless communication system according to various embodiments of the disclosure. FIG. 16 illustrates an operating method of the base station 110 and the UE 120 in FIG. 1. For reference, although FIG. 16 illustrates the UE 120, the UE is not limited thereto. According to various embodiments of the disclosure, the UE 120 may be changed to a plurality of UEs.

Referring to FIG. 16, in operation 1601, the base station 110 performs random grouping. When the base station 110 fails to receive information about the interference state of the UE, such as a UCBP, from the UE 120, the base station 110 may perform random grouping. In various embodiments, random grouping may be performed through a UE grouping procedure as illustrated in FIG. 15A and FIG. 15B.

Figure 17:
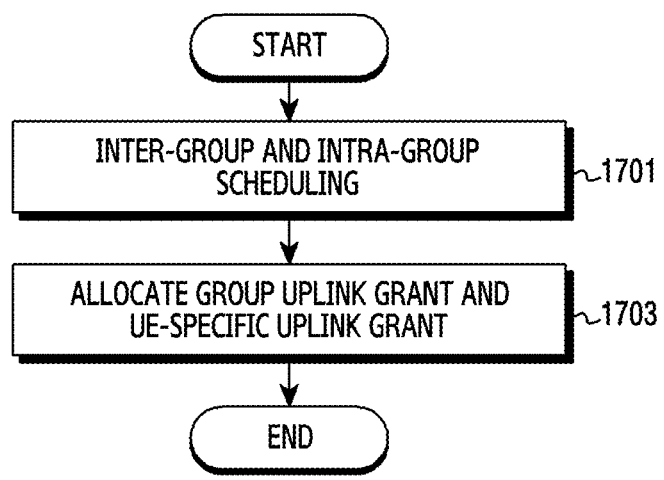
FIG. 17 illustrates a flowchart of a base station allocating an uplink resource in a wireless communication system according to various embodiments of the disclosure.

In operation 1603, the base station 110 configures a group identifier for the UE 120. The base station 110 may group UEs through random grouping and may allocate a group identifier to each group. Subsequently, the base station 110 may transmit information about an identifier of a group including the UE to the UE 120. The base station may group at least one UE according to a procedure described above with reference to FIG. 11 to FIG. 16. After grouping the at least one UE, the base station may allocate a resource to each group. Here, it may be unnecessary to indicate individual grant information to all UEs in the same group. Instead, the issue may be how to guarantee fairness to UEs in a group to which an overbooked resource is allocated. FIG. 17 described below illustrates an uplink resource allocation process performed by a base station for uplink transmission of a UE.

FIG. 17 illustrates a flowchart of a base station allocating an uplink resource in a wireless communication system according to various embodiments of the disclosure. FIG. 17 illustrates an operating method of the base station 110 in FIG. 1.

Referring to FIG. 17, in operation 1701, the base station performs inter-group and intra-group scheduling. For example, in inter-group scheduling, the base station may allocate an orthogonal resource to a group of UEs. In intra-group scheduling, the base station may allocate channel access priority to the UEs in the group in order to guarantee fairness in resource allocation to the UEs.

In operation 1703, the base station allocates a group uplink grant and a UE-specific uplink grant. For example, the base station may transmit a grant for inter-group scheduling to a UE through a control message. Further, the base station may transmit a grant for scheduling of UEs in a group to the individual UEs through a control message. The UEs included in each group may decode information about a resource allocated by the base station through group and UE identifiers, thereby identifying the position of a frequency resource, a channel access priority, or the like.

Figure 18A:
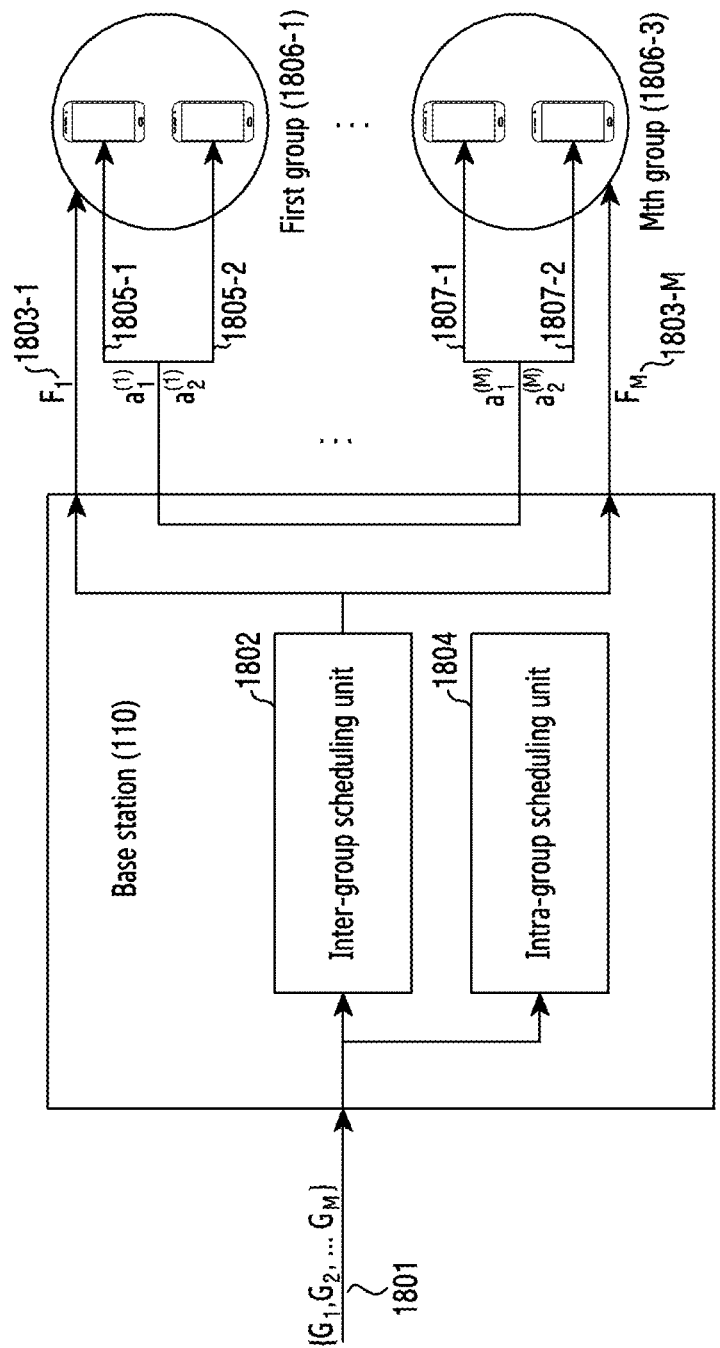
FIG. 18A illustrates a conceptual diagram of an uplink resource allocation procedure in a wireless communication system according to various embodiments of the disclosure.

FIG. 18A illustrates a conceptual diagram of an uplink resource allocation procedure in a wireless communication system according to various embodiments of the disclosure.

Referring to FIG. 18A, the group identifiers {$G_1$, $G_2$, . . . , $G_M$} 1801 of UE groups grouped by a base station may be input to the base station 110. Further, the group identifiers 1801 may be input to an inter-group scheduling unit 1802 and an intra-group scheduling unit 1804 included in the base station 110. According to various embodiments, the inter-group scheduling unit 1802 may allocate an orthogonal resource to each group on the basis of the group identifiers 1801. That is, the same frequency resource may be allocated to UEs in the same group. According to various embodiments, the intra-group scheduling unit 1804 may allocate a channel access priority to UEs in a group. Subsequently, the base station 110 may allocate a grant for an overbooked uplink to groups and UEs. The grant for the overbooked uplink may include a group grant and a UE-specific grant. For example, the inter-group scheduling unit 1802 may allocate group grant $F_1$ 1803-1 to group grant $F_M$ 1803-M to group 1 1806-1 to group M 1806-M, respectively. In addition, the intra-group scheduling unit 1804 may allocate UE-specific grants $a_1^{(1)}$1805-1 and $a_2^{(1)}$1805-2 to UEs included in group 1 1806-1 and may allocate UE-specific grants $a_1^{(M)}$1807-1 and $a_2^{(M)}$1807-2 to UEs included in group M 1806-M. The group grant and the UE-specific grant may be decoded with a group identifier and a UE identifier in the UE.

Figure 18B:
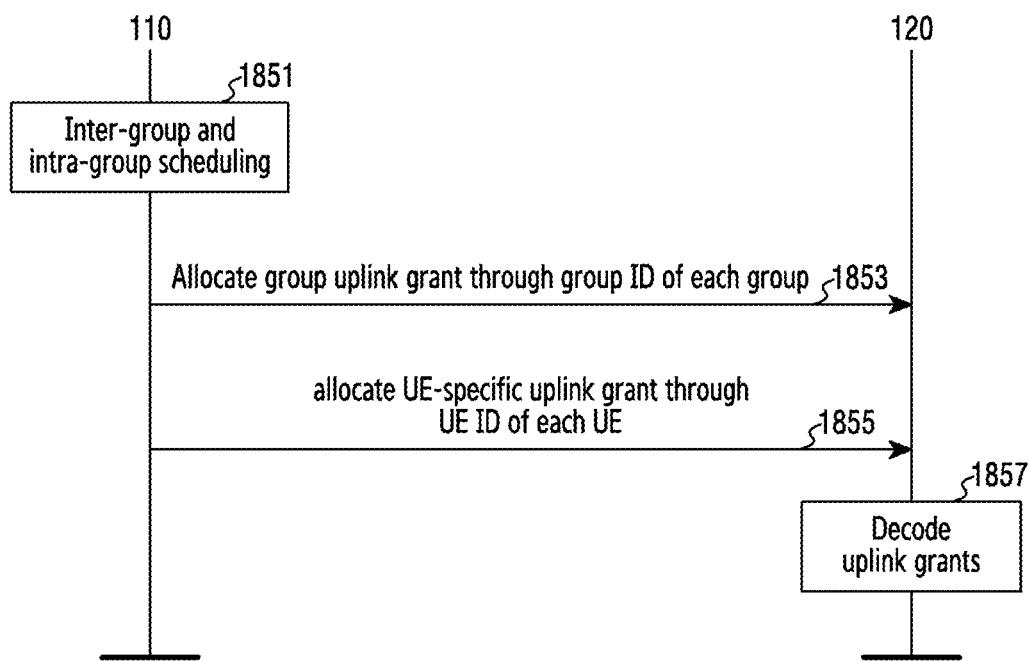
FIG. 18B illustrates a sequence diagram of an uplink resource allocation procedure in a wireless communication system according to various embodiments of the disclosure.

FIG. 18B illustrates a sequence diagram of an uplink resource allocation procedure in a wireless communication system according to various embodiments of the disclosure. FIG. 18B illustrates an operating method of the base station 110 and the UE 120 in FIG. 1. For reference, although FIG. 18B illustrates the UE 120, the UE is not limited thereto. According to various embodiments of the disclosure, the UE 120 may be changed to a plurality of UEs.

Figure 19:
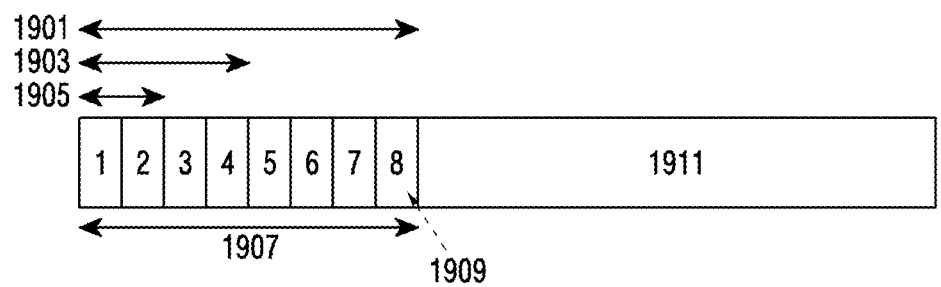
FIG. 19 illustrates an example of a method for scheduling UEs in a group in a wireless communication system according to various embodiments of the disclosure.
Figure 20:
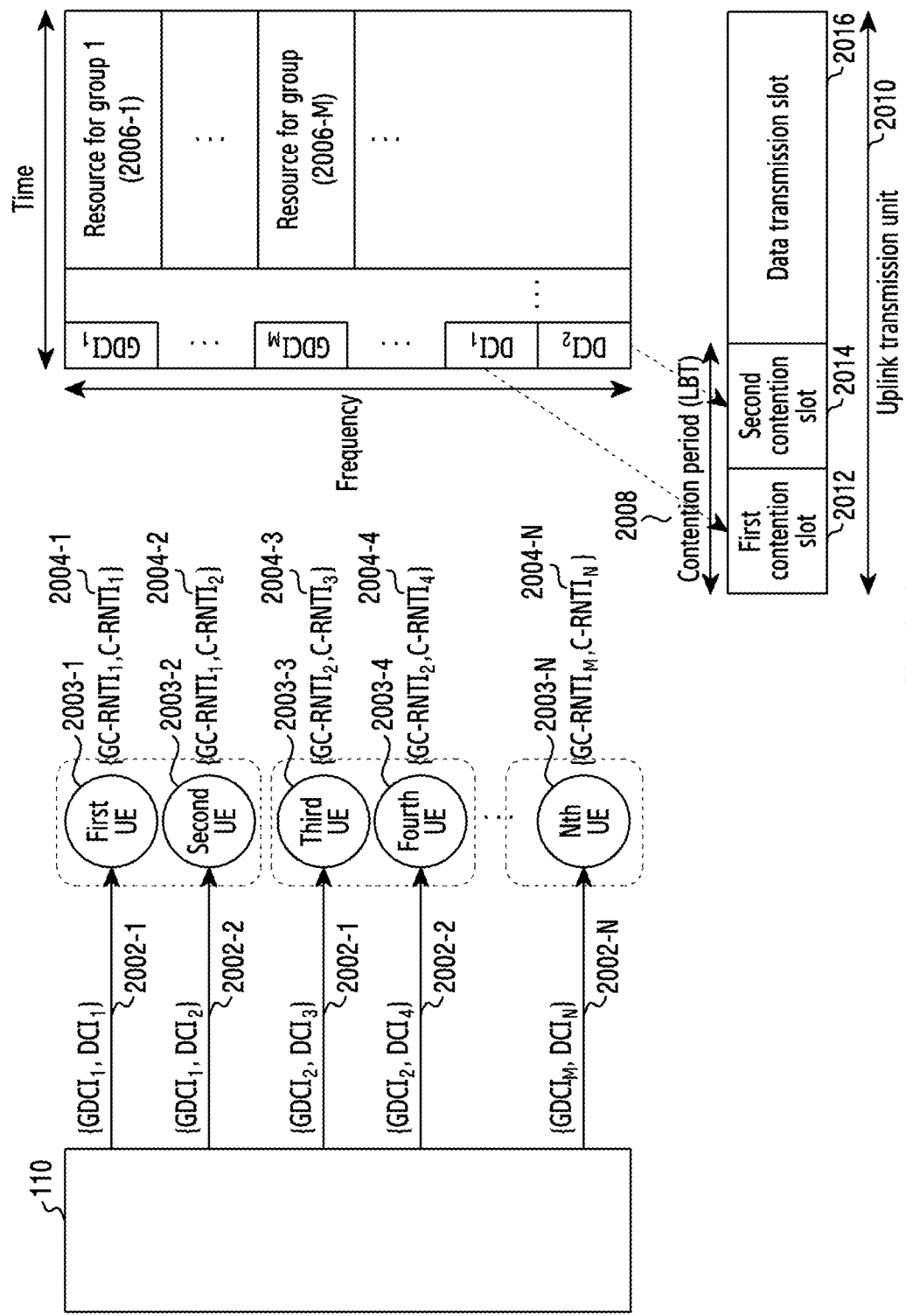
FIG. 20 illustrates an example of an uplink resource allocation method in a wireless communication system according to various embodiments of the disclosure.

Referring to FIG. 18B, in operation 1851, the base station 110 may perform inter-group scheduling and intra-group scheduling. In inter-group scheduling, the base station 110 may allocate an orthogonal frequency resource to a group of UEs. For example, in a system supporting LAA or NR-U, the base station 110 may allocate an orthogonal uplink resource block (RB) to each UE group. In intra-group scheduling, the base station 110 may allocate channel access priority to the UEs in the group in order to guarantee fairness in resource allocation to the UEs. The base station 110 may transmit information about the priority to the UE 120 through UE control information. In one embodiment, the information about the priority may indicate an LBT priority that enables a UE to occupy a channel prior to other UEs in a group when the UE having the channel continuously occupied by a neighboring interferer has no interferer. For example, in the system supporting LAA or NR-U, the information about the priority may be the contention window size (CWS) of uplink LBT of each UE or the index of a particular contention slot (CS). In one embodiment, scheduling of UEs in a group may be performed as shown in FIG. 19. Referring to FIG. 19, the base station may classify UEs in each group in descending order according to a proportional fair (PF) metric and may allocate a different contention window size for each UE. For example, the PF metric of a UE may be determined by Equation 1.

$$q_i[n] = \frac{r_i[n]}{R_i[n-1]} \qquad \text{[Equation 1]}$$

In Equation 1, $q_i[n]$ may denote the PF metric of an ith UE at an nth scheduling time, $r_i[n]$ may denote the instantaneous data rate of the ith UE at the nth scheduling time, and $\bar{R}_i[n-1]$ may denote the average throughput of the ith UE at an n−1th scheduling time. When the PF metrics of three UEs are classified in the order of $q_1[n]>q_2[n]>q_3[n]$, in a contention period 1907 including CCA slots 1909, the contention window size 1905 of a first UE may have first and second contention slots allocated thereto, the contention window size 1903 of a second UE may have first to fourth contention slots allocated thereto, and the contention window size 1901 of a third UE may have first to eighth contention slots allocated thereto. Having a slot closer to the first contention slot may mean having a higher channel access priority. Data transmission 1911 may be performed after the contention period 1907. In various embodiments, the base station may prioritize UEs in each group according to a round-robin method or a maximum signal-to-interference-plus-noise ratio (max-SINR) method. According to the max-SINR method, the base station may arrange link qualities or channel states indicating a CQI value fed back from each UE in descending order and may allocate a high priority to a UE having a good link quality or channel state.

In operation 1853, the base station 110 may allocate a group uplink grant through a group identifier for each group. The base station 110 may code the CRC of group DCI (GDCI), which includes information about a frequency resource allocated to each group, with a GC-RNTI and may transmit the CRC to each UE group.

In operation 1855, the base station 110 may allocate a UE-specific uplink grant through a UE identifier for each UE. For example, the base station 110 may code the CRC of UE-specific DCI, which is for indicating information about a priority allocated to each UE in the group, with a C-RNTI, and may transmit the CRC to the UE 120. For example, referring to FIG. 20, the base station 110 may transmit group DCI and UE-specific DCI {$GDCI_1$, $DCI_1$} 2002-1 to a first UE 2003-1, group DCI and UE-specific DCI {$GDCI_1$, $DCI_2$} 2002-1 to a second UE 2003-2, group DCI and UE-specific DCI {$GDCI_2$, $DCI_3$} 2002-3 to a third UE 2003-3, group DCI and UE-specific DCI {$GDCI_2$, $DCI_4$} 2002-4 to a fourth UE 2003-4, and group DCI and UE-specific DCI {$GDCI_M$, $DCI_M$} 2002-N to an Nth UE 2003-N.

Figure 21A:
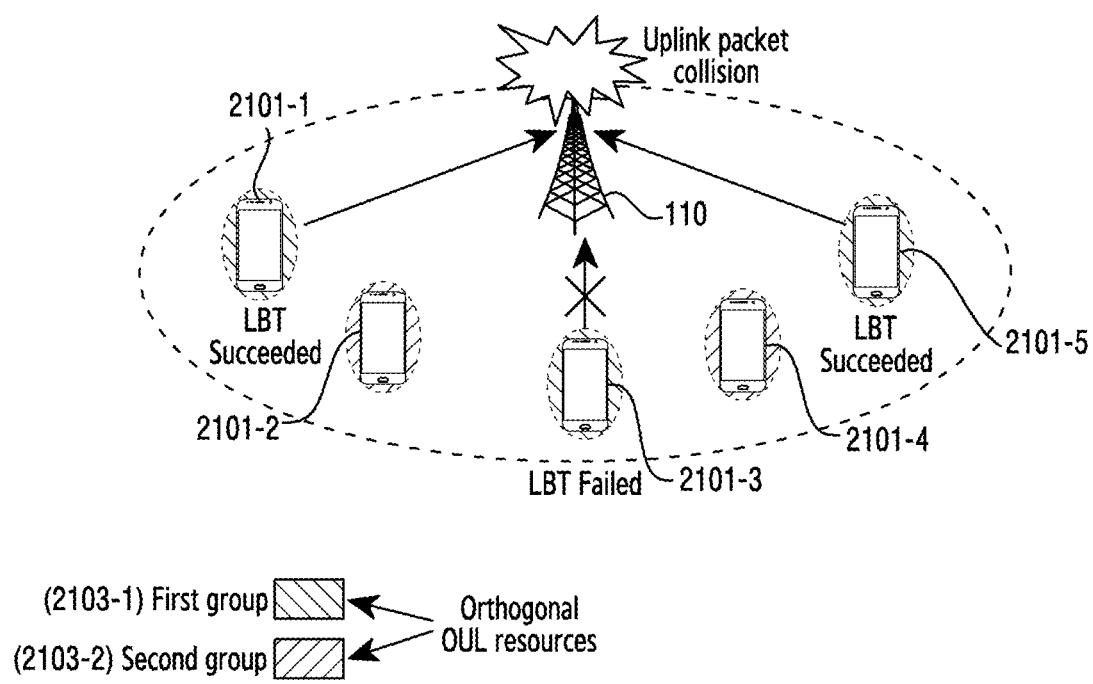
FIG. 21A illustrates a problem that may occur in channel access for an uplink of a UE in a wireless communication system according to various embodiments of the disclosure.
Figure 21B:
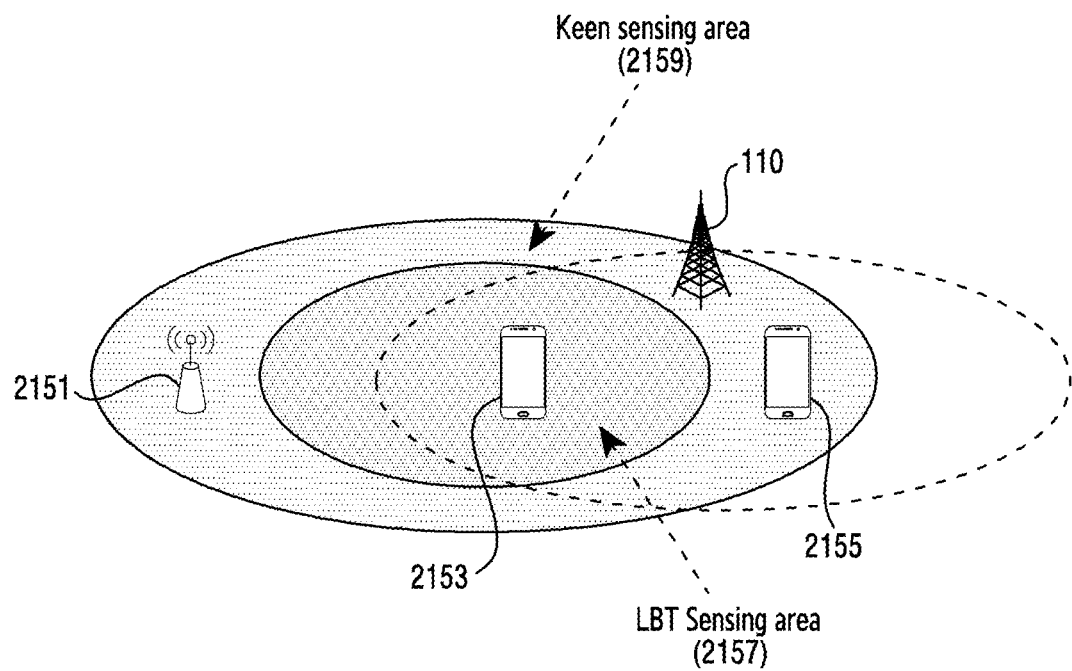
FIG. 21B illustrates a problem that may occur in channel access for an uplink of a UE in a wireless communication system according to various embodiments of the disclosure.

In operation 1857, the UE 120 may decode the uplink grants. For example, the UE 120 may decode information about a resource allocated by the base station through a group identifier and a UE identifier. For example, referring to FIG. 20, the first UE 2003-1 may obtain information about {$GC-RNTI_1$, $C-RNTI_1$} 2004-1 from the base station, the second UE 2003-2 may obtain information about {$GC-RNTI_1$, $C-RNTI_2$} 2004-2 from the base station, the third UE 2003-3 may obtain information about {$GC-RNTI_2$, $C-RNTI_3$} 2004-3 from the base station, the fourth UE 2003-4 may obtain information about {$GC-RNTI_2$, $C-RNTI_4$} 2004-4 from the base station, and the Nth UE 2003-N may obtain information about {$GC-RNTI_M$, $C-RNTI_N$} 2004-N from the base station. Each UE may obtain information about the position of a frequency resource through blind decoding using the GC-RNTI and may obtain priority information for channel access and other information (e.g., an HARQ and an MCS) through blind decoding using the C-RNTI. For example, referring to FIG. 20, the first UE 2003-1 and the second UE 2003-2 included in group 1 may identify the position of a resource 2006-1 for group 1 through blind decoding using $GC-RNTI_1$. The Nth UE 2003-N included in group M may identify the position of a resource 2006-M for group M through blind decoding using $GC-RNTI_M$. Further, the first UE 2003-1 and the second UE 2003-2 included in group 1 may identify the positions of a first contention slot 2012 and a second contention slot 2014 in an uplink transmission unit 2010 including a contention period 2008 for LBT and a data transmission slot 2016 through blind decoding using $C-RNTI_1$ and $C-RNTI_2$. Through the above-described process, uplink resources may be allocated for groups and UEs. After an uplink resource is allocated, the UE may perform channel access for uplink transmission. FIG. 21A and FIG. 21B illustrate problems in channel access.

FIG. 21A illustrates a problem that may occur in channel access for an uplink of a UE in a wireless communication system according to various embodiments of the disclosure.

Referring to FIG. 21A, when orthogonal OUL resources are allocated to a first group 2103-1 and a second group 2103-1, the first group 2103-1 includes a UE 2101-1, a UE 2101-3, and a UE 2101-5, and the second group 2103-2 includes a UE 2101-2 and a UE 2101-4, the UE 2101-1 and the UE 2101-5, which are allocated the same resource, may succeed in LBT, but the UE 2101-3 may fail in LBT. However, even though LBT is successful, a collision may occur between uplink packets when the UE 2101-1 and the UE 2101-5 transmit uplink data packets to a base station 110 after being allocated the same resource.

FIG. 21B illustrates a problem that may occur in channel access for an uplink of a UE in a wireless communication system according to various embodiments of the disclosure.

Figure 22:
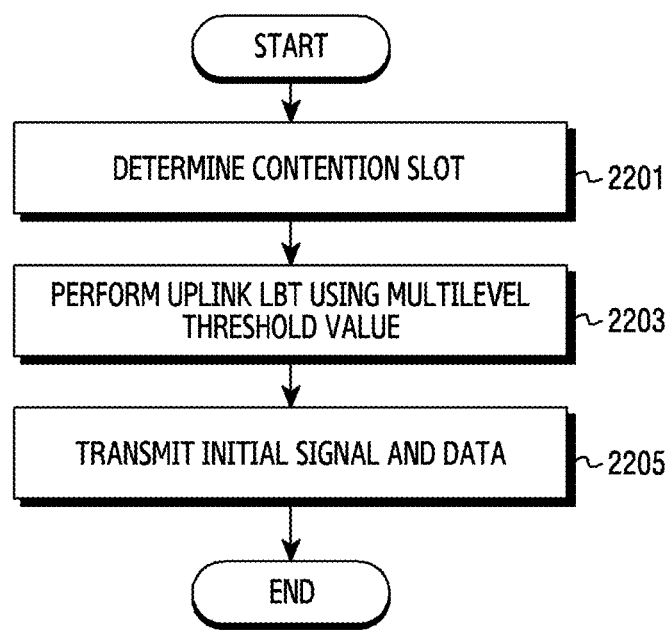
FIG. 22 illustrates a flowchart of a UE for channel access in a wireless communication system according to various embodiments of the disclosure.

Referring to FIG. 21B, a first UE 2153 and a second UE 2155 may be serviced by a base station 110. It may be difficult for the first UE 2153 to detect the second UE 2155, which is included in a group allocated the same OUL resource, with an energy detection (ED) threshold value for uplink LBT. That is, the second UE 2155 may not be included in the LBT sensing area 2157 of the first UE 2153. Here, when the first UE 2153 simply performs LBT with a low energy detection threshold value in order to detect the second UE 2155, a keen sensing area 2159 may be formed due to the low energy detection threshold value, and a Wi-Fi node 2151 may be included in the area. As a result, when the first UE 2153 detects an unnecessary signal from the Wi-Fi node 2151, the channel occupancy probability of the first UE 2153 may be reduced. In order to solve the foregoing problem in channel access, only one UE in each group may be allowed to access a channel, and UEs may access the channel for an uplink according to priorities thereof. FIG. 22 described below illustrates a channel access procedure by a UE according to various embodiments of the disclosure.

FIG. 22 illustrates a flowchart of a UE for channel access in a wireless communication system according to various embodiments of the disclosure. FIG. 22 illustrates an operating method of the UE 120 in FIG. 1.

Referring to FIG. 22, in operation 2201, the UE determines a contention slot. For example, the UE may determine a contention slot for uplink channel access according to a channel access priority allocated by a base station in a resource allocation procedure. In one embodiment, the UE may randomly determine a contention slot thereof within a contention window size set by the base station. Here, a UE having a high priority may have a contention window size set to be smaller than that of a UE having a low priority. In another embodiment, the UE may be allocated a contention slot index directly by the base station and may determine the slot having the index to be the contention slot thereof. Accordingly, it is possible to prevent UEs in the same group from performing channel access in the same slot.

In operation 2203, the UE performs uplink LBT using a multilevel threshold value. For example, in uplink LBT, the UE may use not only an energy detection threshold value (a first threshold value) for detecting an interferer, such as a Wi-Fi node, but also a threshold (second threshold value) for detecting other UEs in a group including the UE. Accordingly, the UE can detect both an interferer, such as a Wi-Fi node, and other UEs in the same group.

In operation 2205, the UE transmits an initial signal and data. Upon occupying a channel first and transmitting an initial signal to the base station through the foregoing channel access procedure illustrated in operation 2201 and operation 2203, the UE may transmit uplink data at the position of time and frequency resources allocated by the base station.

Figure 23A:
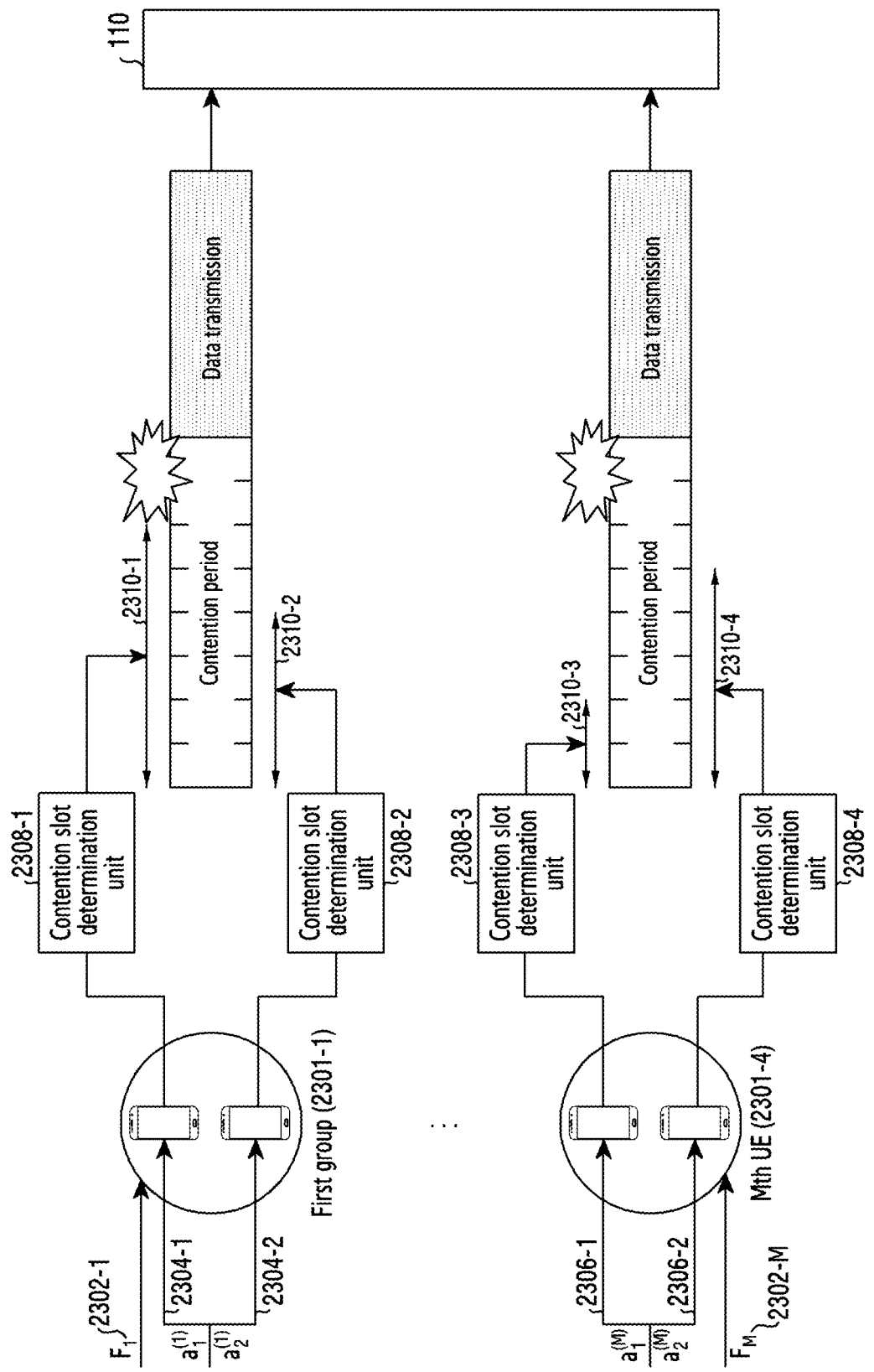
FIG. 23A illustrates a conceptual diagram of a channel access procedure in a wireless communication system according to various embodiments of the disclosure.

FIG. 23A illustrates a conceptual diagram of a channel access procedure in a wireless communication system according to various embodiments of the disclosure.

Referring to FIG. 23A, a group grant $F_1$ 2302-1 for a first group 2301-1, a UE-specific grant $a_1^{(1)}$2304-1 for a first UE, and a UE-specific grant $a_2^{(1)}$2304-2 for a second UE may be input to the first group 2301-1. Further, a group grant $F_M$ 2302-M for an Mth group 2301-4, a UE-specific grant $a_1^{(M)}$2306-1 for a third UE, and a UE-specific grant $a_2^{(M)}$ 2306-2 for a fourth UE may be input to the Mth group 2301-4. Although not shown in FIG. 23A, a contention slot determination unit 2308-1 may be included in the first UE of the first group 2301-1, a contention slot determination unit 2308-2 may be included in the second UE of the first group 2301-1, a contention slot determination unit 2308-3 may be included in the third UE of the Mth group 2301-4, and a contention slot determination unit 2308-4 may be included in the fourth UE of the Mth group 2301-4. In various embodiments, the contention slot determination unit 2308-1 may determine a contention slot on the basis of a contention window size 2310-1 for the first UE included in the UE-specific grant $a_1^{(1)}$2304-1 for the first UE. The contention slot determination unit 2308-2 may determine a contention slot on the basis of a contention window size 2310-2 for the second UE included in the UE-specific grant $a_2^{(1)}$2304-2 for the second UE. Here, since the contention window size 2310-1 for the first UE is greater than the contention window size 2310-2 for the second UE, the second UE may have a higher channel access priority than the first UE. In various embodiments, the contention slot determination unit 2308-3 may determine a contention slot on the basis of a contention window size 2310-3 for the third UE included in the UE-specific grant $a_1^{(M)}$ 2306-1 for the third UE. The contention slot determination unit 2308-4 may determine a contention slot on the basis of a contention window size 2310-4 for the fourth UE included in the UE-specific grant $a_2^{(M)}$2306-2 for the fourth UE. Here, since the contention window size 2310-3 for the third UE is smaller than the contention window size 2310-4 for the fourth UE, the third UE may have a higher channel access priority than the fourth UE. In various embodiments, UEs may select respective contention slots thereof from among slots having a corresponding contention window size. Further, the UEs may perform uplink LBT using a multilevel threshold value in the respective contention slots thereof. Subsequently, the UEs may transmit data to a base station 110.

Figure 23B:
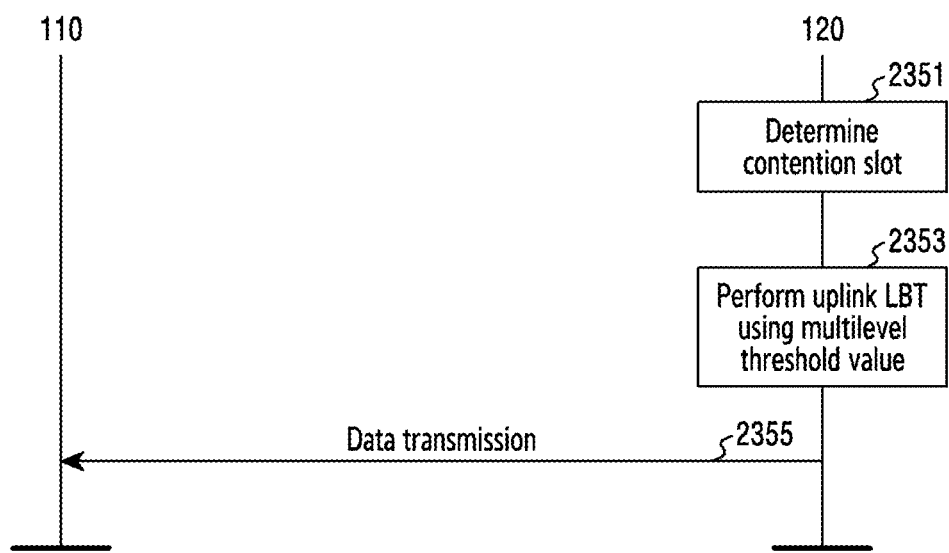
FIG. 23B illustrates a sequence diagram of a channel access procedure in a wireless communication system according to various embodiments of the disclosure.

FIG. 23B illustrates a sequence diagram of a channel access procedure in a wireless communication system according to various embodiments of the disclosure. FIG. 23B illustrates an operating method of the base station 110 and the UE 120 in FIG. 1. For reference, although FIG. 23B illustrates the UE 120, the UE is not limited thereto. According to various embodiments of the disclosure, the UE 120 may be changed to a plurality of UEs.

Figure 24A:
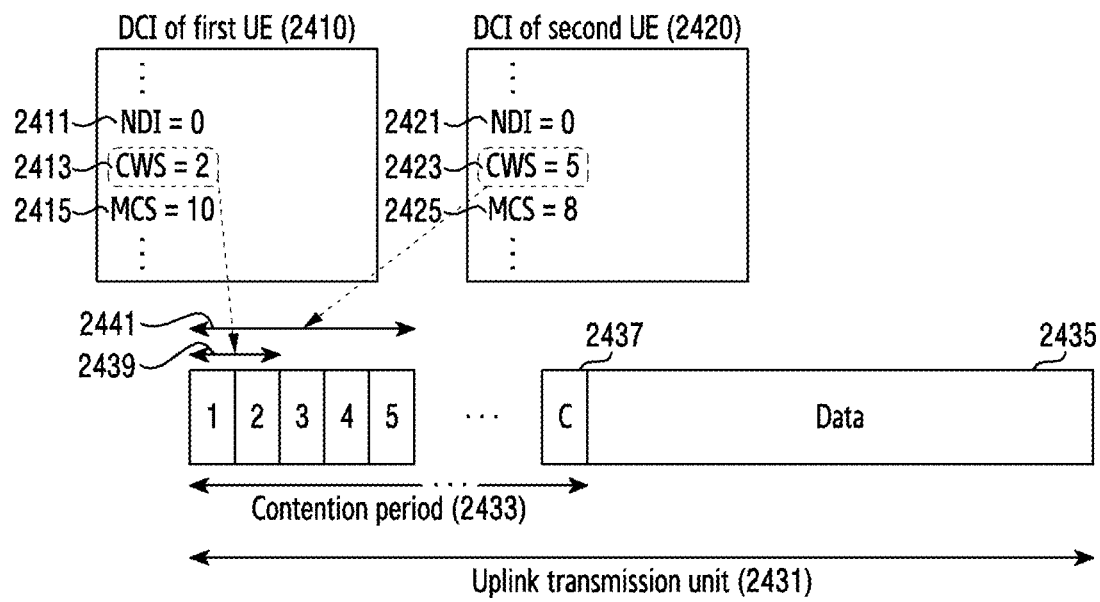
FIG. 24A illustrates an example of determining a contention slot using a contention window size in a wireless communication system according to various embodiments of the disclosure.
Figure 24B:
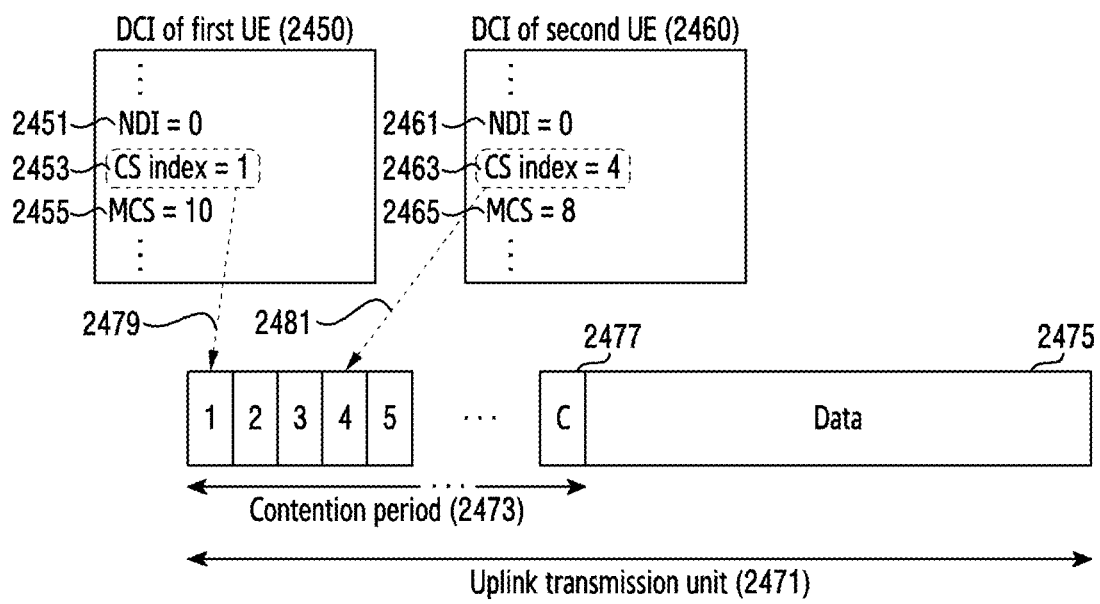
FIG. 24B illustrates an example of determining a contention slot using a contention slot index in a wireless communication system according to various embodiments of the disclosure.

Referring to FIG. 23B, in operation 2351, the UE may determine a contention slot. In one embodiment, the UE may randomly determine a contention slot thereof within the range of a contention window size set by the base station. Here, a UE having a high priority may have a contention window size set to be smaller than that of a UE having a low priority. For example, FIG. 24A illustrates an example of determining a contention slot using a contention window size in a wireless communication system according to various embodiments of the disclosure. Referring to FIG. 24A, DCI 2410 of a first UE received from the base station may include an NDI 2411 having a value of 0, a CWS 2413 having a value of 2, and an MCS 2415 having a value of 10. DCI 2420 of a second UE received from the base station may include an NDI 2421 having a value of 0, a CWS 2423 having a value of 5, and an MCS 2425 having a value of 8. The UEs may determine a contention slot within the range of the respective CWSs. For example, when a contention period 2433 including contention slots 2437 and a data transmission period 2435 are formed in an uplink transmission unit 2431, since the CWS 2413 allocated to the first UE is 2, the first UE may determine the contention slot thereof within a contention window 2439 including two contention slots. Further, since the CWS allocated to the second UE is 5, the second UE may determine the contention slot thereof within a contention window 2441 including five contention slots. In another embodiment, each UE may be allocated a contention slot (CS) index directly by the base station and may determine a contention slot thereof on the basis of the CS index. Here, a UE having a high priority may be allocated a lower CS index than a UE having a low priority. For example, FIG. 24B illustrates an example of determining a contention slot using a contention slot index in a wireless communication system according to various embodiments of the disclosure. Referring to FIG. 24B, DCI 2450 of a first UE received from the base station may include an NDI 2451 having a value of 0, a CS index 2453 having a value of 1, and an MCS 2455 having a value of 10. DCI 2460 of a second UE received from the base station may include an NDI 2461 having a value of 0, a CS index 2463 having a value of 4, and an MCS 2465 having a value of 8. Each UE may determine a contention slot on the basis of a corresponding CS index. For example, when a contention period 2473 including contention slots 2477 and a data transmission period 2475 are formed in an uplink transmission unit 2471, since the CS index 2453 allocated to the first UE is 1, the first UE may determine a first contention slot 2479 to be the contention slot thereof. Further, since the CS index 2463 allocated to the second UE is 4, the second UE may determine a fourth contention slot 2481 to be the contention slot thereof. In still another embodiment, when UEs fail to be allocated a CWS, fail to be allocated a CS index, or are allocated a CS index of 0 by the base station, each UE may randomly select a contention slot thereof within a default contention window range. As such, the UE may randomly select a contention slot within a predetermined range, or may be allocated a contention slot index directly by the base station, thereby minimizing the occurrence of a collision incurred by UEs selecting the same contention slot.

In operation 2353, the UE may perform uplink LBT using a multilevel threshold value. In various embodiments, the UE may perform channel access using an energy detection threshold value used to detect an external interferer, such as a Wi-Fi node, and an initial signal detection threshold value used to detect an initial signal from another UE in the same group. For example, the UE may detect a signal from an external interferer using the energy detection threshold value, and may detect an initial signal from another UE in the same group using the initial signal detection threshold value in the contention slot thereof. When neither a signal from an external interferer nor an initial signal from another UE in the same group is detected, the UE occupies a channel and may successfully achieve channel access.

In various embodiments, the UE may receive system information (SI) including information about the energy detection threshold value or the initial signal detection threshold value from the base station. Alternatively, the UE may receive the information about the energy detection threshold value or the initial signal detection threshold value from the base station via a control message, such as an RRC message.

Figure 25:
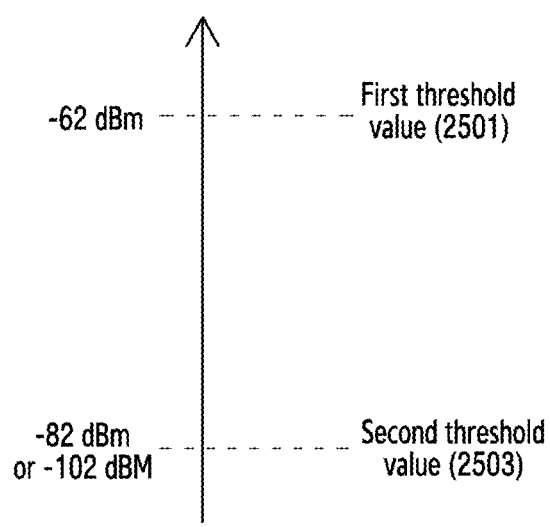
FIG. 25 illustrates an example of energy detection using a two-level threshold value in a wireless communication system according to various embodiments of the disclosure.

In various embodiments, the initial signal detection threshold value may be set to a value lower than the energy detection threshold value that the UE uses to detect an external interferer, such as a Wi-Fi node. For example, as illustrated in FIG. 25, a first threshold value 2501 representing the energy detection threshold value may be set to −62 dBm, and a second threshold value 2503 representing the initial signal detection threshold value may be set to −82 dBm or −102 dBm, which is lower than the first threshold value. In various embodiments, the initial signal detection threshold value may be determined using Equation 2.

$$P_{Rx}=P_{Tx}+G_{Tx}-L_{Tx}-L_{Rx}+G_{Rx}-L_P(d)-N \quad \text{[Equation 2]}$$

In Equation 2, $P_{Rx}$ may denote an initial signal detection threshold value for detecting initial signals from other UEs in the same group, $P_{Tx}$ may denote the transmission power of a UE, $T_x$ may denote the antenna transmission gain of the UE, $R_x$ may denote the antenna reception gain of the UE, $L_{Tx}$ may denote a cable transmission loss, $L_{Rx}$ may denote a cable reception loss, N may denote a noise figure, and $L_P(d)$ may denote a path loss according to the distance d from the UE. In various embodiments, the initial signal detection threshold value $P_{Rx}$ may decrease as the distance d from the UE increases. For example, when the distance d from the UE is 43 m, the initial signal detection threshold value $P_{Rx}$ may be determined to be −82 dBm; when the distance d from the UE is 123 m, the initial signal detection threshold value $P_{Rx}$ may be determined to be −102 dBm. In one embodiment, $L_P(d)$ may be determined by Equation 3.

$$L_P(d)=43.3 \log_{10}(d)+11.5+20 \log_{10}(f_c) \quad \text{[Equation 3]}$$

In Equation 3, $L_P(d)$ may denote a path loss according to the distance d from the UE, and $f_c$ may denote a center frequency.

In operation 2355, the UE may transmit data to the base station. For example, upon occupying a channel first and transmitting an initial signal through the foregoing channel access procedure, the UE may transmit uplink data at the position of allocated time and frequency resources. Here, since the base station needs to identify which UE in the group occupies the channel, the initial signal may include information about the UE. The base station may identify that the initial signal received from the UE has been transmitted from the UE and may decode the received uplink data using the information about the UE. For example, the initial signal may be transmitted together with a message including the C-RNTI of the UE or may include information about the C-RNTI of the UE. Here, the message including the C-RNTI of the UE may be transmitted using an MCS commonly used by all UEs in the cell of the base station. Hereinafter, FIG. 26 illustrates a specific uplink LBT procedure using a multilevel threshold value, and FIG. 27 illustrates the configuration of a frame in the case where a UE transmits an initial signal and data.

Figure 26:
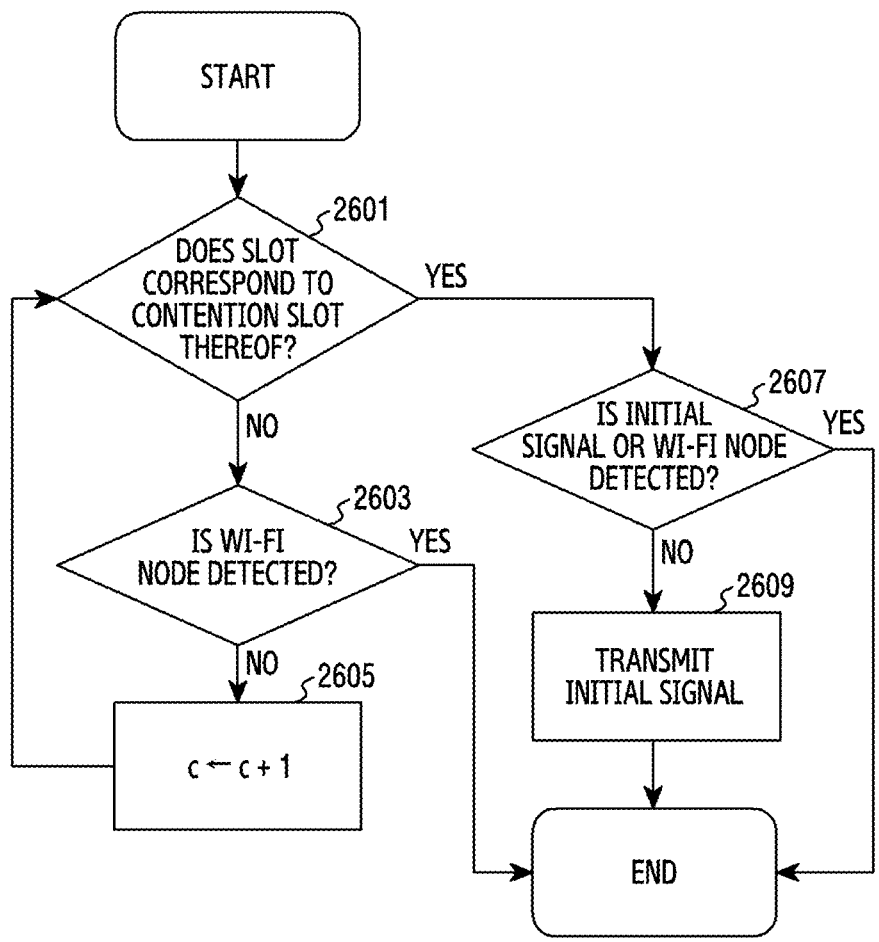
FIG. 26 illustrates a flowchart of a UE performing an uplink listen-before-talk (LBT) procedure using a multilevel threshold value in a wireless communication system according to various embodiments of the disclosure.
Figure 27:
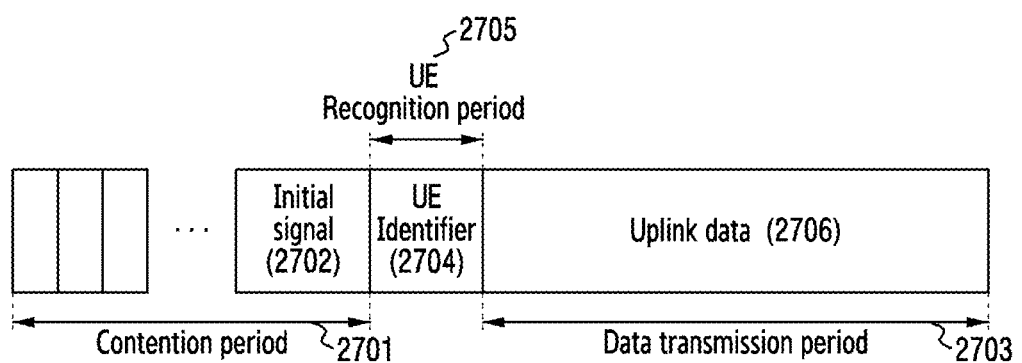
FIG. 27 illustrates an example of a frame configuration in the case where an initial signal and data are transmitted in a wireless communication system according to various embodiments of the disclosure.

FIG. 26 illustrates a flowchart of a UE performing an uplink LBT procedure using a multilevel threshold value in a wireless communication system according to various embodiments of the disclosure.

Referring to FIG. 26, the multilevel threshold may include an initial signal detection threshold value for detecting an initial signal from a different UE in the same group and an energy detection threshold value for detecting an external interferer, such as a Wi-Fi node. In operation 2601, the UE may determine whether a slot is a contention slot thereof. For example, the UE may determine whether a slot is a contention slot thereof starting from a first slot having a contention slot index of 1 in a contention period. When a slot is a contention slot thereof, the UE may perform operation 2607; when a slot is not a contention slot thereof, the UE may perform operation 2603.

In operation 2603, the UE may determine whether a Wi-Fi node is detected. For example, the UE may detect an external interferer, such as a Wi-Fi node, using the energy detection threshold value. When a Wi-Fi node is detected, a channel access procedure may be terminated. In various embodiments, detection of an interferer using the energy detection threshold value may be included in the above-described CCA procedure. When no Wi-Fi node is detected, the UE may change a contention slot index c to c+1 in operation 2605 and may perform operation 2601 again.

In operation 2607, the UE may identify whether an initial signal or a Wi-Fi node is detected. For example, the UE may detect an initial signal transmitted from a different UE in the same group using the initial signal detection threshold value. Further, the UE may detect an external interferer, such as a Wi-Fi node, using the energy detection threshold value. In various embodiments, the initial signal detection threshold value may be lower than the energy detection threshold value. When an initial signal or a Wi-Fi node is detected, the channel access procedure may be terminated. When neither an initial signal nor a Wi-Fi node is detected, the UE may perform operation 2609.

In operation 2609, the UE may transmit an initial signal. In various embodiments, the initial signal may include a control signal for identifying channel access of the UE. After transmitting the initial signal, the UE may transmit data to the base station.

FIG. 27 illustrates an example of a frame configuration in the case where an initial signal and data are transmitted in a wireless communication system according to various embodiments of the disclosure.

Referring to FIG. 27, a UE 120 may perform channel access within a contention period 2701. When the UE 120 successfully accesses a channel in relation to other UEs in the same group, the UE 120 may transmit an initial signal 2702 to a base station 110. Here, the initial signal 2702 may be a sequence commonly used in the cell of the base station. Subsequently, the UE 120 may transmit a UE identifier 2704 to the base station 110 in a UE recognition period 2705. The UE identifier 2704 may be the C-RNTI of the UE. In one embodiment, the UE recognition period 2705 may be determined using a fixed payload size and a predetermined MCS. Subsequently, the UE 120 may transmit uplink data 2706 to the base station 110 in a data transmission period 2703.

Figure 28:
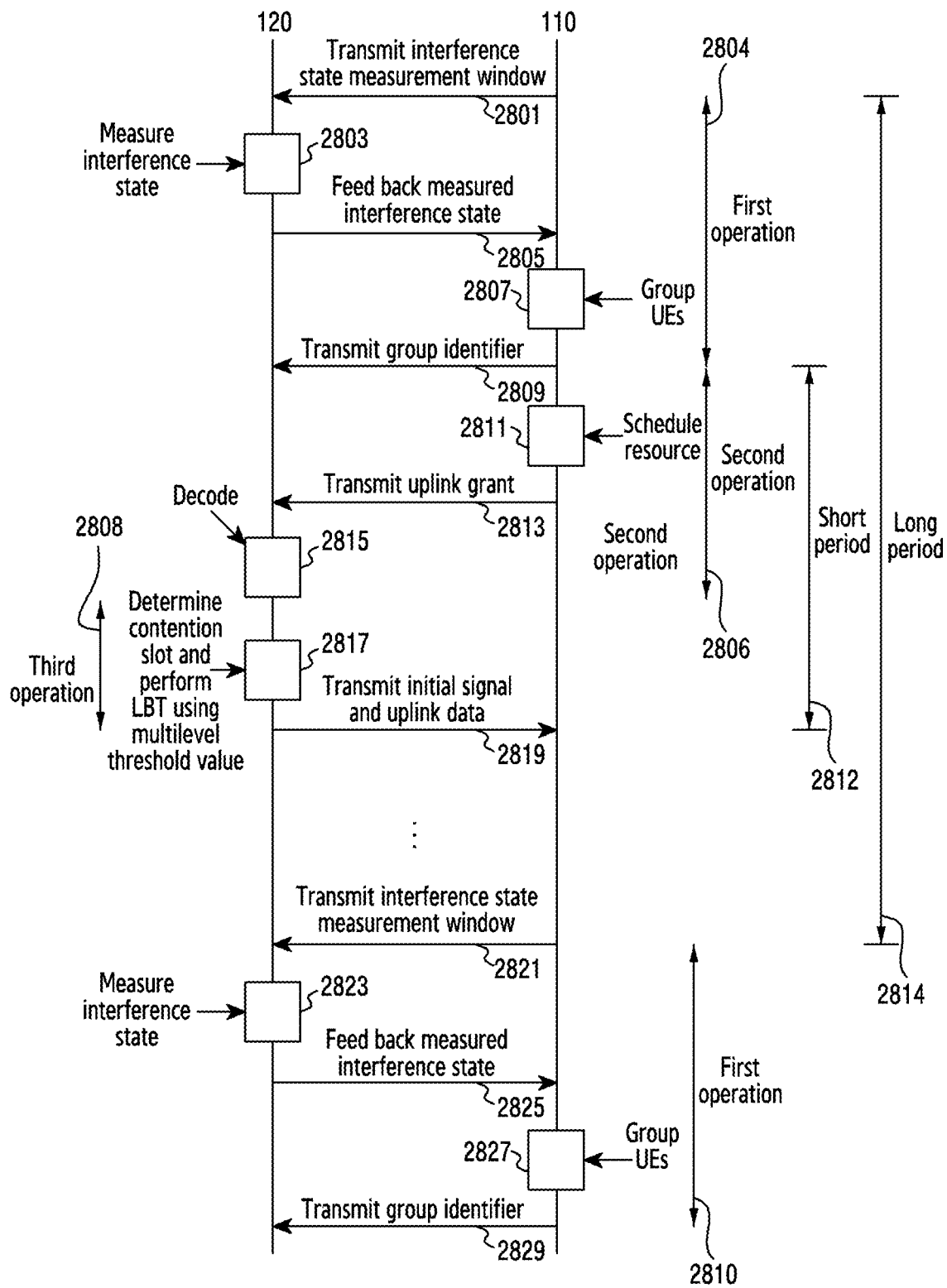
FIG. 28 illustrates an overall procedure for performing OUL transmission in an unlicensed band in a wireless communication system according to various embodiments of the disclosure.

FIG. 28 illustrates an overall procedure for performing overbooked uplink (OUL) transmission in an unlicensed band in a wireless communication system according to various embodiments of the disclosure. FIG. 28 illustrates an operating method of the base station 110 and the UE 120 in FIG. 1. For reference, although FIG. 28 illustrates the UE 120, the UE is not limited thereto. According to various embodiments of the disclosure, the UE 120 may be changed to a plurality of UEs.

Referring to FIG. 28, in operation 2801, the base station may transmit an interference state measurement window to the UE. In various embodiments, the interference state measurement window may include at least one slot for UCBP measurement.

In operation 2803, the UE may measure an interference state. For example, the UE may measure a UCBP in the at least one slot in the interference state measurement window configured by the base station.

In operation 2805, the UE may feed the measured interference state back to the base station. Although not shown in FIG. 28, the UE may receive a message triggering feedback of UCBP information from the base station and may transmit a feedback message including UCBP information to the base station after a certain period of time.

In operation 2807, the base station may perform UE grouping. For example, the base station may group UEs on the basis of the UCBP information received from the UE. Here, the base station may determine that UEs having different UCBPs receive interference from different interferers or interference sources. In one embodiment, the base station may group UEs having different interferers into one group and may allocate a group identifier for each group.

In operation 2809, the base station may transmit a group identifier to the UE. For example, the base station may transmit, to the UE, a group identifier allocated to each group classified through a grouping procedure. In various embodiments, the group identifier may be referred to as a GC-RNTI.

In operation 2811, the base station may perform resource scheduling. For example, the base station may allocate orthogonal frequency resources to different groups and may allocate a channel access priority to UEs in a group.

In operation 2813, the base station may transmit an uplink grant. For example, the uplink grant may include a group uplink grant allocated through a group identifier and a UE-specific uplink grant allocated through a UE identifier.

In operation 2815, the UE may perform decoding. For example, the UE may decode the uplink grant received from the base station, thereby identifying the position of a frequency resource allocated by the base station and determining a channel access priority.

In operation 2817, the UE may determine a contention slot and may perform LBT using a multilevel threshold value. For example, the UE may determine a contention slot for channel access within the range of a contention window size set by the base station, or may determine a contention slot on the basis of a contention slot index set by the base station. Further, the UE may perform uplink LBT using a two-level threshold value including a first threshold value for detecting an external interferer, such as a Wi-Fi node, and a second threshold value for detecting other UEs in the same group in a contention slot thereof.

In operation 2819, the UE may transmit an initial signal and uplink data. For example, the base station may successfully achieve channel access through operation 2817 and may transmit an initial signal indicating confirmation of the channel access to the base station. Subsequently, the UE may transmit uplink data to the base station. Through operations 2801 to 2819 described above, the UE may transmit uplink data to the base station in an environment in which an overbooked uplink scheme is applied. Here, operations 2801 to 2819 may be referred to as a long period 2814, operations 2811 to 2819 may be referred to as a short period 2812, operations 2801 to 2809 may be referred to as a first operation 2804, and operations 2811 to 2819 may be referred to as a second operation 2806. Subsequently, a procedure for uplink data transmission may be performed again as follows.

In operation 2821, the base station may transmit an interference state measurement window to the UE. In various embodiments, the interference state measurement window may include at least one slot for UCBP measurement.

In operation 2823, the UE may measure an interference state. For example, the UE may measure a UCBP in the at least one slot in the interference state measurement window configured by the base station.

In operation 2825, the UE may feed the measured interference state back to the base station. Although not shown in FIG. 28, the UE may receive a message triggering feedback of UCBP information from the base station and may transmit a feedback message including UCBP information to the base station after a certain period of time.

In operation 2827, the base station may perform UE grouping. For example, the base station may group UEs on the basis of the UCBP information received from the UE.

In operation 2829, the base station may transmit a group identifier to the UE. For example, the base station may transmit, to the UE, a group identifier allocated to each group classified through a grouping procedure. In various embodiments, operations 2821 to 2829 may be referred to as a first operation 2810. Although not shown in FIG. 28, the same resource scheduling and channel access procedure as described above may be performed after operation 2829.

Figure 29A:
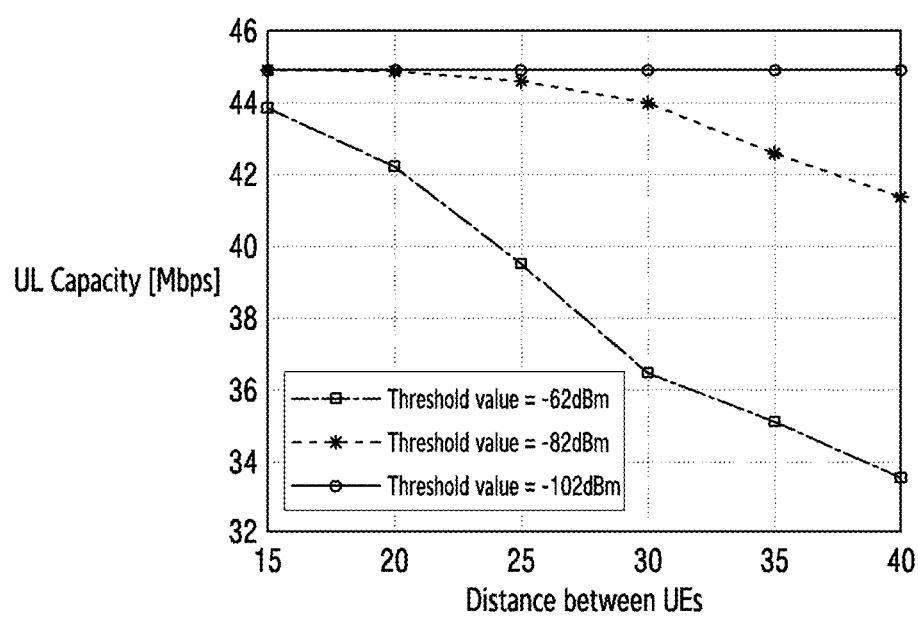
FIG. 29A illustrates a graph of uplink capacity in a first embodiment of a wireless communication system according to various embodiments of the disclosure.

Through the above-described procedure, UEs having overbooked uplink resources allocated thereto may transmit uplink data to the base station. FIG. 29A to FIG. 31C, described below, illustrate graphs showing the results of an experiment for identifying the effect of the disclosure. The experiment has been performed in an environment in which ten NR-U UEs are uniformly located within a radius R of one NR-U base station, in which R is a simulation control parameter, and in which five interfering Wi-Fi nodes are located around the UEs. Further, it is assumed that NR-U uses an uplink full-buffer, and Wi-Fi does not actually generate traffic and is turned on/off according to the UCBP value p of a UE. In this case, a model for the p of the UE may be assumed to use a randomly generated fixed value. In addition, it may be assumed in the experiment that the number K of UEs per group is 2, that the number G of groups is 5, that the grouping method is random grouping or the grouping method illustrated in FIG. 15A, that resource allocation is performed such that the same orthogonal resource is allocated to each group, and that the range of selection of contention slots for channel access is determined such that, when the number C of contention slots in a contention period is 15, any slot is randomly selected from among the slots. The performance indicators considered in the experiment are UL capacity, resource utilization efficiency (RUE), representing the ratio of resources actually used to allocated resources, and a collision probability, representing the ratio of the number of times UEs in a group simultaneously perform transmission to the total number of transmissions. Hereinafter, FIG. 29A to FIG. 29C illustrate graphs of the respective performance indicators according to a change in the distance R.

Figure 29B:
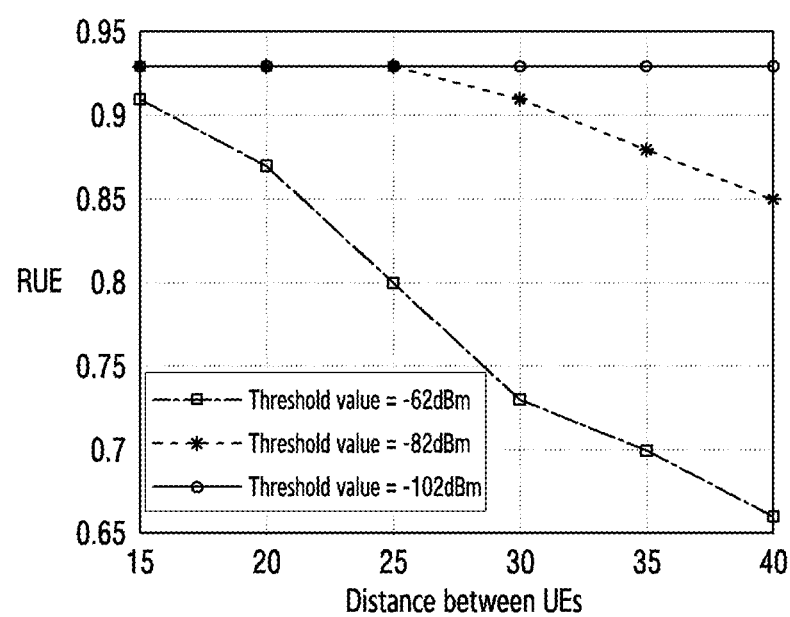
FIG. 29B illustrates a graph of uplink resource utilization efficiency (RUE) in the first embodiment of a wireless communication system according to various embodiments of the disclosure.
Figure 29C:
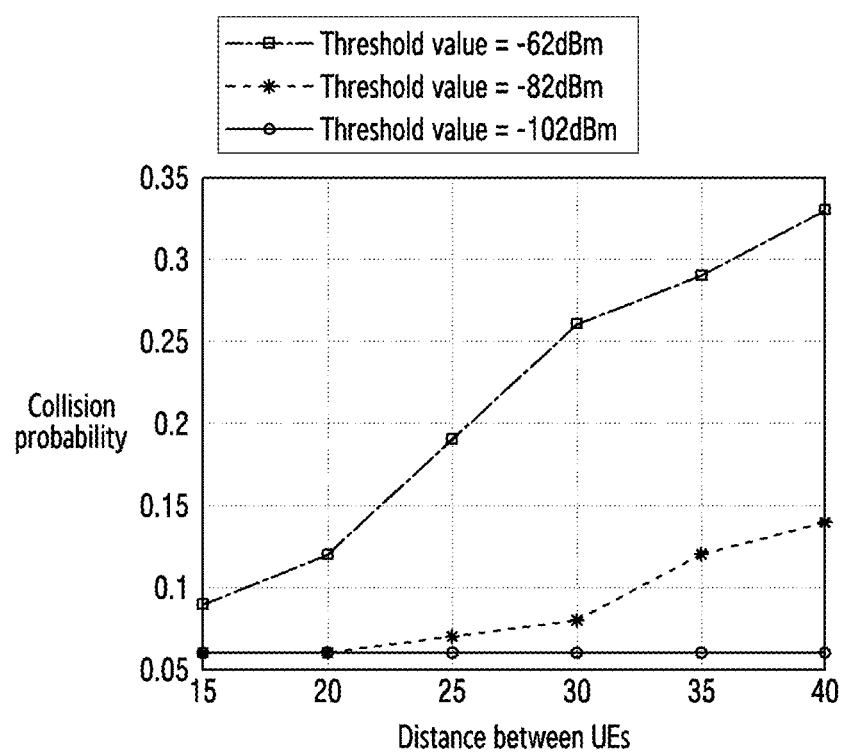
FIG. 29C illustrates a graph of the probability of a collision between UEs in a group in the first embodiment of a wireless communication system according to various embodiments of the disclosure.

Scenario 1, corresponding to a first embodiment illustrated in FIG. 29A to FIG. 29C, is for identifying how often a collision between UEs in a group occurs according to an initial signal detection threshold value when a random grouping scheme is used and there is no Wi-Fi node as an external interferer.

FIG. 29A illustrates a graph of uplink capacity in the first embodiment of a wireless communication system according to various embodiments of the disclosure.

Referring to FIG. 29A, when a threshold value is −82 dBm or −62 dBm, rather than −102 dBm, the uplink capacity may decrease as the distance R between UEs increases. There may be an uplink capacity difference of up to 33% between a threshold value of −62 dBm and a threshold value of −102 dBm as the distance R between UEs increases.

FIG. 29B illustrates a graph of uplink RUE in the first embodiment of a wireless communication system according to various embodiments of the disclosure.

Referring to FIG. 29B, the RUE has a graph shape similar to the graph of the uplink capacity in FIG. 29A. The reason for this is that, as the distance R between UEs increases, a UE cannot completely detect UEs in a group with −62 dBm or −82 dBm, and thus a collision may occur in a channel access process. When a threshold value is −102 dBm, the UE can effectively detect all UEs in the group even where R is 40 m. Here, a collision may occur with a probability of about 6%.

FIG. 29C illustrates a graph of the probability of a collision between UEs in a group in the first embodiment of a wireless communication system according to various embodiments of the disclosure.

Referring to FIG. 29C, as the distance R between UEs increases, a collision probability may increase in the case where a threshold value is −62 dBm and in the case where the threshold value is −82 dBm. However, when the threshold value is −102 dBm, the collision probability is lower than in the above two cases. Here, a collision probability of about 6% may be determined depending on the number C of contention slots in a contention period.

Figure 30A:
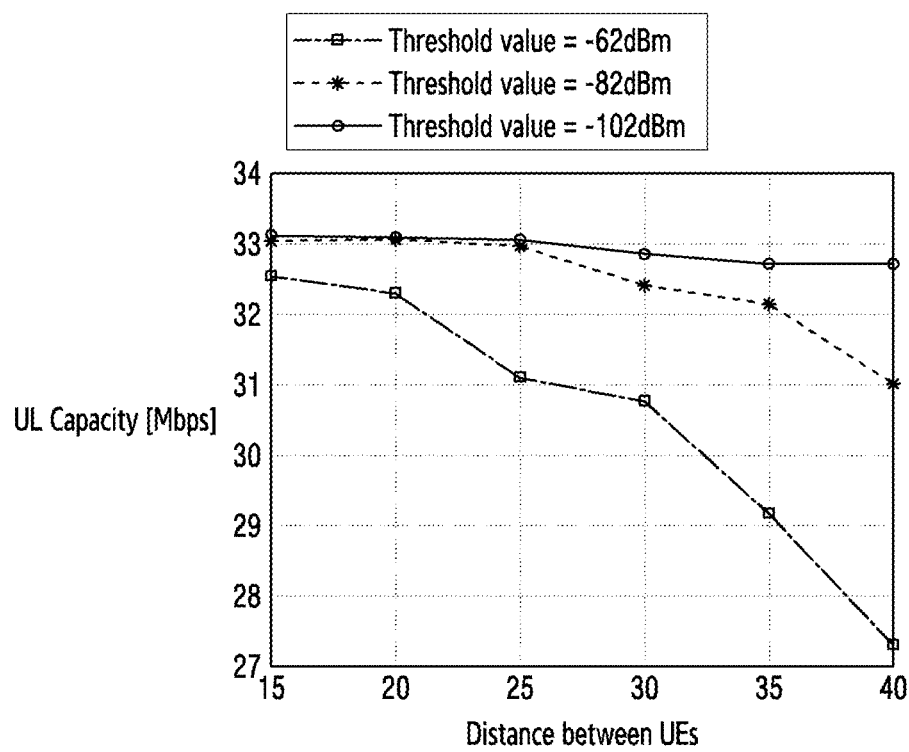
FIG. 30A illustrates a graph of uplink capacity in a second embodiment of a wireless communication system according to various embodiments of the disclosure.
Figure 30B:
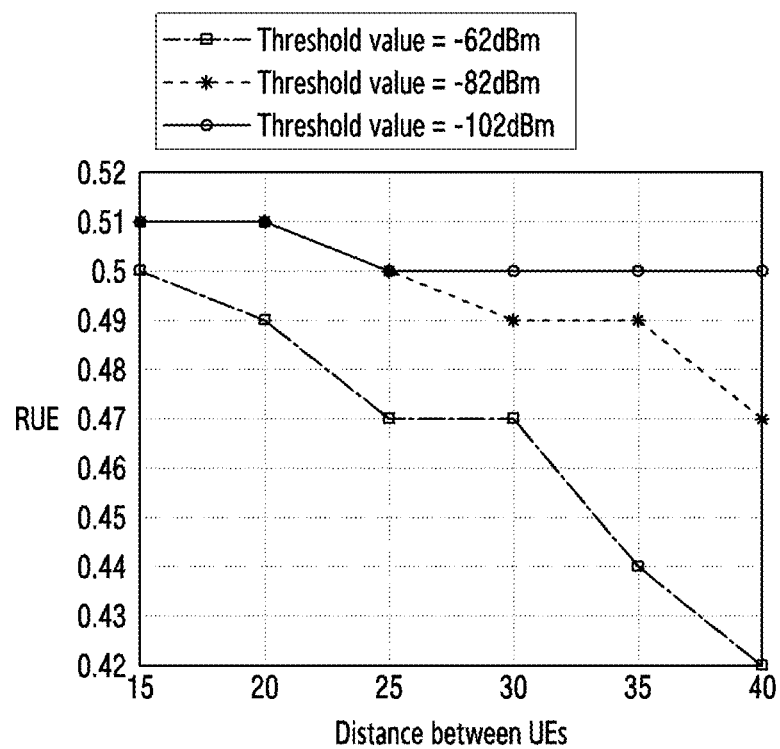
FIG. 30B illustrates a graph of uplink resource utilization efficiency (RUE) in the second embodiment of a wireless communication system according to various embodiments of the disclosure.
Figure 30C:
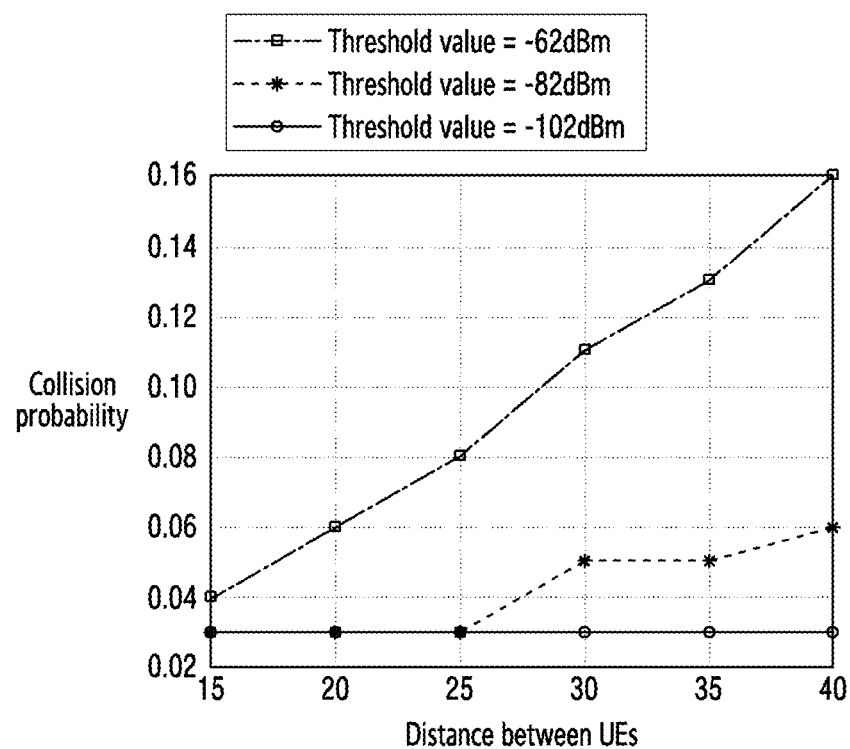
FIG. 30C illustrates a graph of the probability of a collision between UEs in a group in the second embodiment of a wireless communication system according to various embodiments of the disclosure.

Scenario 2, corresponding to a second embodiment illustrated in FIG. 30A to FIG. 30C, is for identifying a change in overall performance compared to Scenario 1 according to an initial signal detection threshold value when a random grouping scheme is used and there is a Wi-Fi node as an external interferer.

FIG. 30A illustrates a graph of uplink capacity in the second embodiment of a wireless communication system according to various embodiments of the disclosure.

Referring to FIG. 30A, it is identified that the overall uplink capacity is reduced in Scenario 2 compared to Scenario 1. There is an uplink capacity difference of up to 33% between a threshold value of −62 dBm and a threshold value of −102 dBm in Scenario 1, while there is an uplink capacity difference of about 20% in Scenario 2. The reason for this is that some of the UEs in a group fail to occupy a channel due to the occupancy of the channel by the Wi-Fi node, thus reducing the occurrence of a collision between UEs.

FIG. 30B illustrates a graph of uplink RUE in the second embodiment of a wireless communication system according to various embodiments of the disclosure.

Referring to FIG. 30B, the RUE has a graph shape similar to the graph of the uplink capacity in FIG. 30A. In Scenario 1, the graph of the RUE shows a very high RUE when a threshold value is −102 dBm. In Scenario 2, since Wi-Fi exists, about half of the resources allocated to the UE may be utilized.

FIG. 30C illustrates a graph of the probability of a collision between UEs in a group in the second embodiment of a wireless communication system according to various embodiments of the disclosure.

Referring to FIG. 30C, compared to the collision probability of the UE in Scenario 1, it is identified that the collision probability of a UE in Scenario 2 is reduced. That is, in Scenario 2, it is identified that an overall collision probability is reduced due to a collision between UEs and failure of channel occupation due to the Wi-Fi node compared to that in Scenario 1.

Figure 31A:
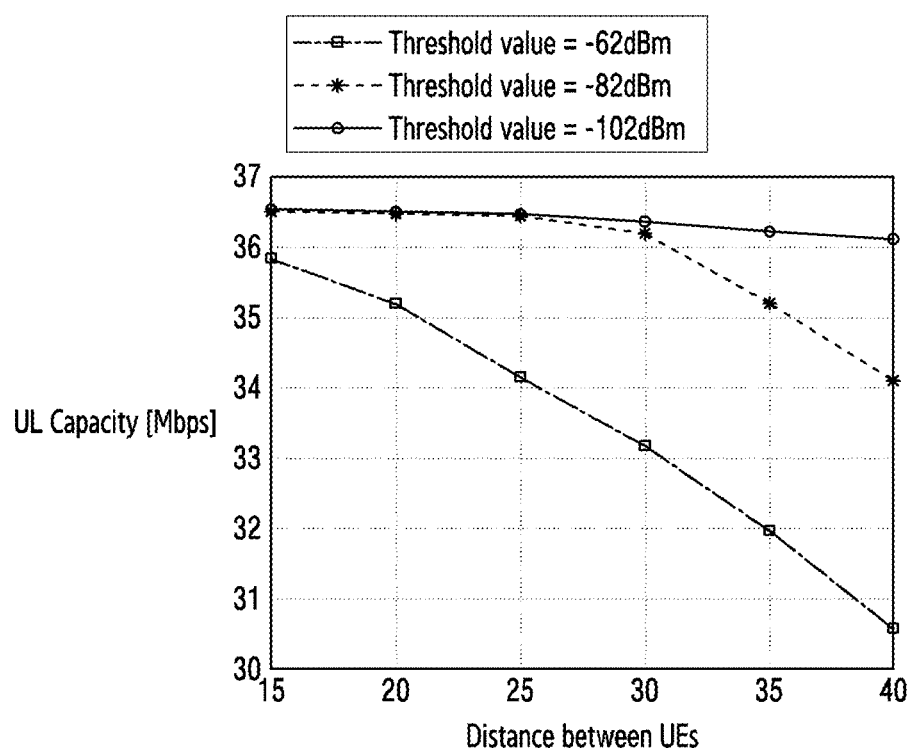
FIG. 31A illustrates a graph of uplink capacity in a third embodiment of a wireless communication system according to various embodiments of the disclosure.
Figure 31B:
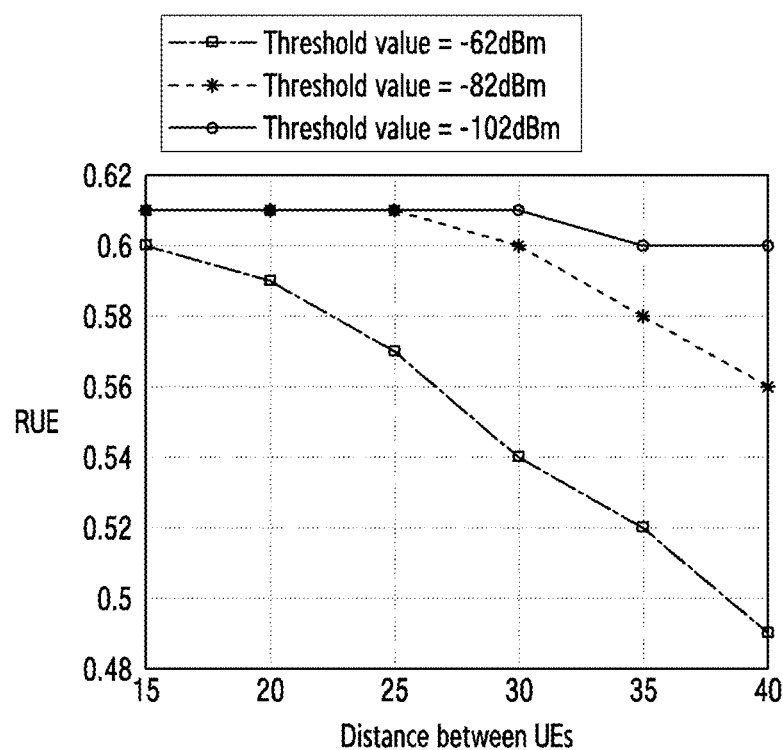
FIG. 31B illustrates a graph of uplink resource utilization efficiency (RUE) in the third embodiment of a wireless communication system according to various embodiments of the disclosure.
Figure 31C:
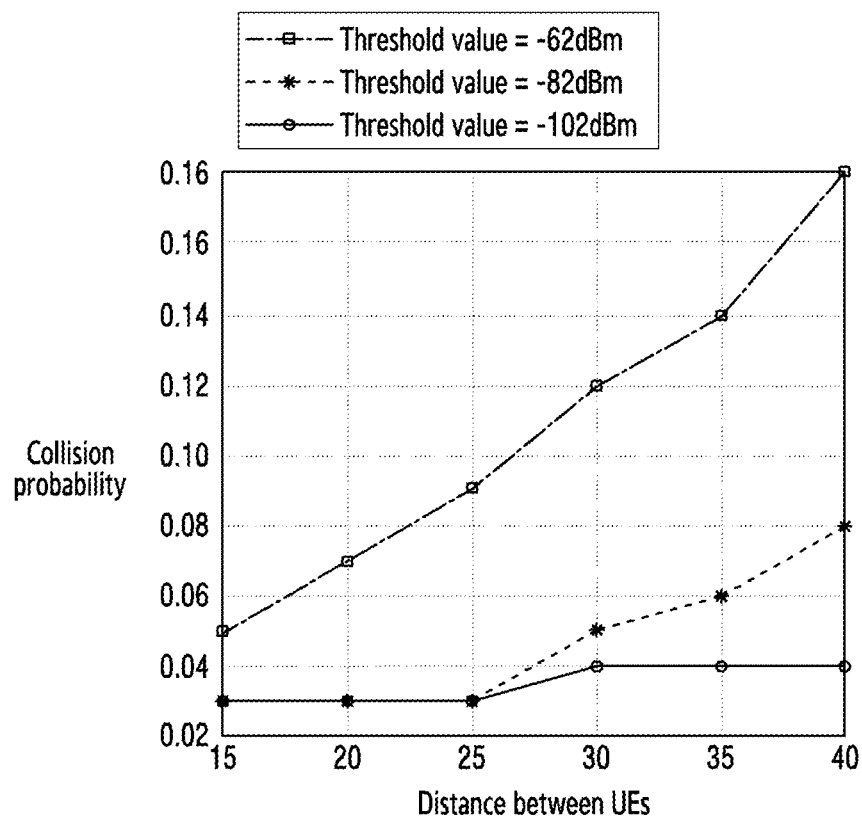
FIG. 31C illustrates a graph of the probability of a collision between UEs in a group in the third embodiment of a wireless communication system according to various embodiments of the disclosure.

Scenario 3, corresponding to a third embodiment illustrated in FIG. 31A to FIG. 31C, is for identifying a change in overall performance compared to Scenario 2 according to an initial signal detection threshold value when UE grouping is performed by the method illustrated in FIG. 15A and there is a Wi-Fi node acting as an external interferer.

FIG. 31A illustrates a graph of uplink capacity in the third embodiment of a wireless communication system according to various embodiments of the disclosure.

Referring to FIG. 31A, it is identified that the uplink capacity in Scenario 3 has a performance gain of about 10% in all threshold values compared to the uplink capacity in Scenario 2. The reason for this is that, because UE grouping is performed by the method illustrated in FIG. 15A, UEs having different interferers are grouped, thus generating diversity gain. In this experiment, since the number K of UEs per group is set to 2, the diversity gain may be up to two.

FIG. 31B illustrates a graph of uplink RUE in the third embodiment of a wireless communication system according to various embodiments of the disclosure.

Referring to FIG. 31B, the RUE has a graph shape similar to the graph of the uplink capacity in FIG. 31A. The RUE in Scenario 3 has a higher value than that in Scenario 2. For example, in Scenario 3, when a threshold value is −102 dBm and the distance R between UEs is 40, the RUE is 0.6, which is higher than 0.5 in Scenario 2.

FIG. 31C illustrates a graph of the probability of a collision between UEs in a group in the third embodiment of a wireless communication system according to various embodiments of the disclosure.

Referring to FIG. 31C, Scenario 3 may have almost the same collision probability as Scenario 2. Accordingly, it is identified that a UE-grouping scheme is not a factor affecting the probability of a collision between UEs. In various embodiments, the probability of a collision between UEs may be affected by the number C of contention slots in a contention period or an initial signal detection threshold value. As described above, diversity gain may be obtained through a UE-grouping scheme according to various embodiments of the disclosure. In addition, according to various embodiments of the disclosure, control signaling overhead may be reduced compared to a conventional resource allocation scheme. For example, in an LTE system, it may be assumed that the number U of bits included in DCI format 0 is 34, the number F of bits configured for frequency resource allocation in DCI format 0 is 13, the number N of UEs using an OUL scheme is 25, the number K of OUL UEs per group is 5, and the number G (N/K) of OUL groups is 5. In this case, signaling overhead for resource allocation according to a conventional method may be expressed as U×N, which is 850 bits. However, signaling overhead according to the scheme proposed in various embodiments of the disclosure may be expressed as ((U−F)×N)+(F×), which is 590 bits. Accordingly, it is identified that the resource allocation scheme according to various embodiments of the disclosure has signaling overhead reduced by 30% compared to that of the conventional resource allocation scheme.

Referring to FIG. 1 to FIG. 31C described above, an apparatus and a method according to various embodiments of the disclosure may receive information about a UE group from a base station, may receive uplink resource allocation information corresponding to the UE group from the base station, may perform channel access on the basis of the received uplink resource allocation information, and may transmit uplink data to the base station, thereby reducing signaling overhead and minimizing uncertainty in channel access by the UE.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. An operating method of a user equipment (UE) in a wireless communication system, the method comprising:
   receiving information about a UE group to which a same uplink resource is allocated from a base station;
   receiving uplink resource allocation information corresponding to the UE group from the base station;
   performing channel access for uplink transmission based on the received uplink resource allocation information; and
   transmitting uplink data to the base station after accessing a channel,
   wherein the channel access is performed using a multi-level threshold value in a contention slot for the UE, and
   wherein the multilevel threshold value comprises a first threshold value used to detect an external interferer and a second threshold value used to detect an initial signal from a different UE in the UE group.

2. The method of claim 1, further comprising:
   receiving information about a measurement period for measuring an interference state of the UE from the base station;
   measuring the interference state of the UE in the measurement period; and
   transmitting information about the measured interference state of the UE to the base station.

3. The method of claim 1, wherein the information about the UE group comprises a group identifier allocated per UE group, and the group identifier is used for uplink resource allocation for the UE group.

4. The method of claim 3, wherein the uplink resource allocation information comprises information about a position of an orthogonal frequency resource for the UE group and information about a channel access priority for UEs in the UE group, and
   the information about the channel access priority comprises information about at least one of a contention window size for the UE and a contention slot index for the UE.

5. The method of claim 4, wherein the performing of the channel access for the uplink transmission comprises determining the contention slot for the UE based on the information about the channel access priority, and
   the second threshold value is less than the first threshold value.

6. The method of claim 5, wherein the performing of the channel access for the uplink transmission comprises:
   identifying whether the initial signal from the different UE in the UE group is detected using the second threshold value;
   identifying whether a signal from the external interferer is detected using the first threshold value; and
   transmitting an initial signal reporting the channel access of the UE to the base station in the contention slot for the UE when the initial signal from the different UE or the signal from the external interferer is not detected.

7. The method of claim 5, further comprising:
   receiving information about at least one of the first threshold value and the second threshold value from the base station.

8. An operating method of a base station in a wireless communication system, the method comprising:
   transmitting information about a user equipment (UE) group to which a same uplink resource is allocated to a UE;
   transmitting uplink resource allocation information corresponding to the UE group to the UE; and
   receiving uplink data from the UE,
   wherein the uplink resource allocation information is used for channel access of the UE, and the channel access is performed using a multilevel threshold value in a contention slot for the UE, wherein the multilevel threshold value comprises a first threshold value used to detect an external interferer and a second threshold value used to detect an initial signal from a different UE in the UE group.

9. The method of claim 8, further comprising:
transmitting information about a measurement period for measuring an interference state of the UE to the UE; and
receiving information about the interference state of the UE measured by the UE from the UE.

10. The method of claim 8, wherein the information about the UE group comprises a group identifier allocated per UE group, and the group identifier is used for uplink resource allocation for the UE group.

11. The method of claim 10, wherein the uplink resource allocation information comprises information about a position of an orthogonal frequency resource for the UE group and information about a channel access priority for UEs in the UE group, and
the information about the channel access priority comprises information about at least one of a contention window size for the UE and a contention slot index for the UE.

12. The method of claim 8, further comprising:
receiving an initial signal reporting the channel access of the UE from the UE; and
decoding the uplink data based on information about the UE comprised in the received initial signal.

13. The method of claim 8, further comprising:
transmitting, to the UE, information about at least one of the first threshold value or the second threshold value, and
the second threshold value is less than the first threshold value.

14. A user equipment (UE) in a wireless communication system, the UE comprising:
a transceiver; and
at least one processor operably coupled to the transceiver, and configured to:
receive information about a UE group to which a same uplink resource is allocated from a base station and to receive uplink resource allocation information corresponding to the UE group from the base station; and
perform channel access for uplink transmission based on the received uplink resource allocation information and to transmit uplink data to the base station after accessing a channel,
wherein the channel access is performed using a multilevel threshold value in a contention slot for the UE, and
wherein the multilevel threshold value comprises a first threshold value used to detect an external interferer and a second threshold value used to detect an initial signal from a different UE in the UE group.

15. The UE of claim 14, wherein the at least one processor is further configured to:
receive information about a measurement period for measuring an interference state of the UE from the base station;
measure the interference state of the UE in the measurement period; and
transmit information about the measured interference state of the UE to the base station.

16. The UE of claim 14, wherein the information about the UE group comprises a group identifier allocated per UE group, and the group identifier is used for uplink resource allocation for the UE group.

17. The UE of claim 16, wherein the uplink resource allocation information comprises information about a position of an orthogonal frequency resource for the UE group and information about a channel access priority for UEs in the UE group, and
the information about the channel access priority comprises information about at least one of a contention window size for the UE and a contention slot index for the UE.

18. The UE of claim 17, wherein the at least one processor is further configured to determine the contention slot for the UE based on the information about the channel access priority, and
the second threshold value is less than the first threshold value.

19. The UE of claim 18, wherein the at least one processor is further configured to:
identify whether the initial signal from the different UE in the UE group is detected using the second threshold value and identifies whether a signal from the external interferer is detected using the first threshold value; and
transmit an initial signal reporting the channel access of the UE to the base station in the contention slot for the UE when the initial signal from the different UE or the signal from the external interferer is not detected.

20. The UE of claim 18, wherein the at least one processor is further configured to receive information about at least one of the first threshold value and the second threshold value from the base station.

* * * * *